US012663271B1

(12) United States Patent
Ebrahimi Afrouzi et al.

(10) Patent No.: US 12,663,271 B1
(45) Date of Patent: Jun. 23, 2026

(54) DISCOVERING AND PLOTTING THE BOUNDARY OF AN ENCLOSURE

(71) Applicants: Ali Ebrahimi Afrouzi, Henderson, NV (US); Sebastian Schweigert, Sunnyvale, CA (US); Lukas Robinson, York (CA); Chen Zhang, Redmond, WA (US)

(72) Inventors: Ali Ebrahimi Afrouzi, Henderson, NV (US); Sebastian Schweigert, Sunnyvale, CA (US); Lukas Robinson, York (CA); Chen Zhang, Redmond, WA (US)

(73) Assignee: Bobsweep USA, Las Vegas, NV (US)

( * ) Notice: Subject to any disclaimer, the term of this patent is extended or adjusted under 35 U.S.C. 154(b) by 429 days.

(21) Appl. No.: 18/086,551

(22) Filed: Dec. 21, 2022

Related U.S. Application Data

(63) Continuation of application No. 16/851,614, filed on Apr. 17, 2020, now Pat. No. 11,561,102, which is a
(Continued)

(51) Int. Cl.
G01C 21/30 (2006.01)
A47L 11/40 (2006.01)
(Continued)

(52) U.S. Cl.
CPC .......... G01C 21/30 (2013.01); A47L 11/4011 (2013.01); G01C 21/165 (2013.01); G01C 21/206 (2013.01); G01S 17/89 (2013.01); G05D 1/0088 (2013.01); G05D 1/0219 (2013.01); G05D 1/0246 (2013.01); G05D
1/0272 (2013.01); G05D 1/0274 (2013.01); G06T 7/11 (2017.01); G06T 7/30 (2017.01);
(Continued)

(58) Field of Classification Search
CPC .... G01C 21/30; G01C 21/165; G01C 21/206; A47L 11/4011; A47L 2201/022; A47L 2201/04; G01S 17/89; G05D 1/0088; G05D 1/0219; G05D 1/0272; G05D 1/0274; G05D 1/0242; G05D 1/0246; G05D 1/0255; G05D 1/0257; G06T 7/11; G06T 7/30; G06T 7/55; G06T 7/62; G06T 7/521; G06T 2207/10028
See application file for complete search history.

(56) References Cited

U.S. PATENT DOCUMENTS 8,996,292 B2 * 3/2015 Park ........................ G09B 29/00
701/25
2012/0121161 A1 * 5/2012 Eade ..................... G06F 16/444
901/1
(Continued)

*Primary Examiner* — Harry Y Oh

(57) ABSTRACT

Provided is a robot configured to generate a map of a workspace of the robot based at least in part on data sensed by at least one sensor in different positions and orientations within the workspace. The map of the workspace is saved to a memory of the robot or the cloud. The robot is paired with a software application executed on a smart phone configured to at least display the map of the workspace and receive at least one input designating a modification to the map of the workspace; a unique tag for a subarea within the map of the workspace; a schedule for cleaning by the robot; an area to avoid; and an instruction to start or stop vacuuming or mopping.

20 Claims, 18 Drawing Sheets

Related U.S. Application Data continuation of application No. 16/163,541, filed on Oct. 17, 2018, now Pat. No. 10,612,929.

(60) Provisional application No. 62/746,688, filed on Oct. 17, 2018, provisional application No. 62/740,573, filed on Oct. 3, 2018, provisional application No. 62/740,580, filed on Oct. 3, 2018, provisional application No. 62/740,558, filed on Oct. 3, 2018, provisional application No. 62/688,497, filed on Jun. 22, 2018, provisional application No. 62/674,173, filed on May 21, 2018, provisional application No. 62/666,266, filed on May 3, 2018, provisional application No. 62/665,095, filed on May 1, 2018, provisional application No. 62/661,802, filed on Apr. 24, 2018, provisional application No. 62/655,494, filed on Apr. 10, 2018, provisional application No. 62/648,026, filed on Mar. 26, 2018, provisional application No. 62/640,444, filed on Mar. 8, 2018, provisional application No. 62/637,185, filed on Mar. 1, 2018, provisional application No. 62/637,156, filed on Mar. 1, 2018, provisional application No. 62/631,050, filed on Feb. 15, 2018, provisional application No. 62/616,928, filed on Jan. 12, 2018, provisional application No. 62/614,449, filed on Jan. 7, 2018, provisional application No. 62/613,005, filed on Jan. 2, 2018, provisional application No. 62/599,216, filed on Dec. 15, 2017, provisional application No. 62/591,217, filed on Nov. 28, 2017, provisional application No. 62/590,205, filed on Nov. 22, 2017, provisional application No. 62/573,598, filed on Oct. 17, 2017, provisional application No. 62/573,579, filed on Oct. 17, 2017, provisional application No. 62/573,591, filed on Oct. 17, 2017.

(51) Int. Cl.

| | | |
|---|---|---|
| *G01C 21/16* | (2006.01) | |
| *G01C 21/20* | (2006.01) | |
| *G01S 17/89* | (2020.01) | |
| *G05D 1/00* | (2024.01) | |
| *G06T 7/11* | (2017.01) | |
| *G06T 7/30* | (2017.01) | |
| *G06T 7/521* | (2017.01) | |
| *G06T 7/55* | (2017.01) | |
| *G06T 7/62* | (2017.01) | |

(52) U.S. Cl.
CPC ................. *G06T 7/55* (2017.01); *G06T 7/62* (2017.01); *A47L 2201/022* (2013.01); *A47L 2201/04* (2013.01); *G05D 1/0242* (2013.01); *G05D 1/0255* (2013.01); *G05D 1/0257* (2013.01); *G06T 7/521* (2017.01); *G06T 2207/10028* (2013.01)

(56) References Cited

U.S. PATENT DOCUMENTS

| | | | | |
|---|---|---|---|---|
| 2012/0232738 | A1* | 9/2012 | Jeon ..................... | G05D 1/0219 |
| | | | | 701/25 |
| 2016/0052133 | A1* | 2/2016 | Kim ..................... | A47L 9/2805 |
| | | | | 901/1 |
| 2016/0071239 | A1* | 3/2016 | Giuffrida ................ | G06T 11/60 |
| | | | | 382/284 |
| 2018/0074508 | A1* | 3/2018 | Kleiner ................ | G05D 1/0274 |
| 2018/0190014 | A1* | 7/2018 | Yarborough ............ | G06T 17/05 |
| 2020/0032937 | A1* | 1/2020 | Endara ................... | F16L 3/223 |
| 2024/0192690 | A1* | 6/2024 | Ebrahimi Afrouzi ....................... | |
| | | | | B25J 13/087 |

* cited by examiner

FIG. 12

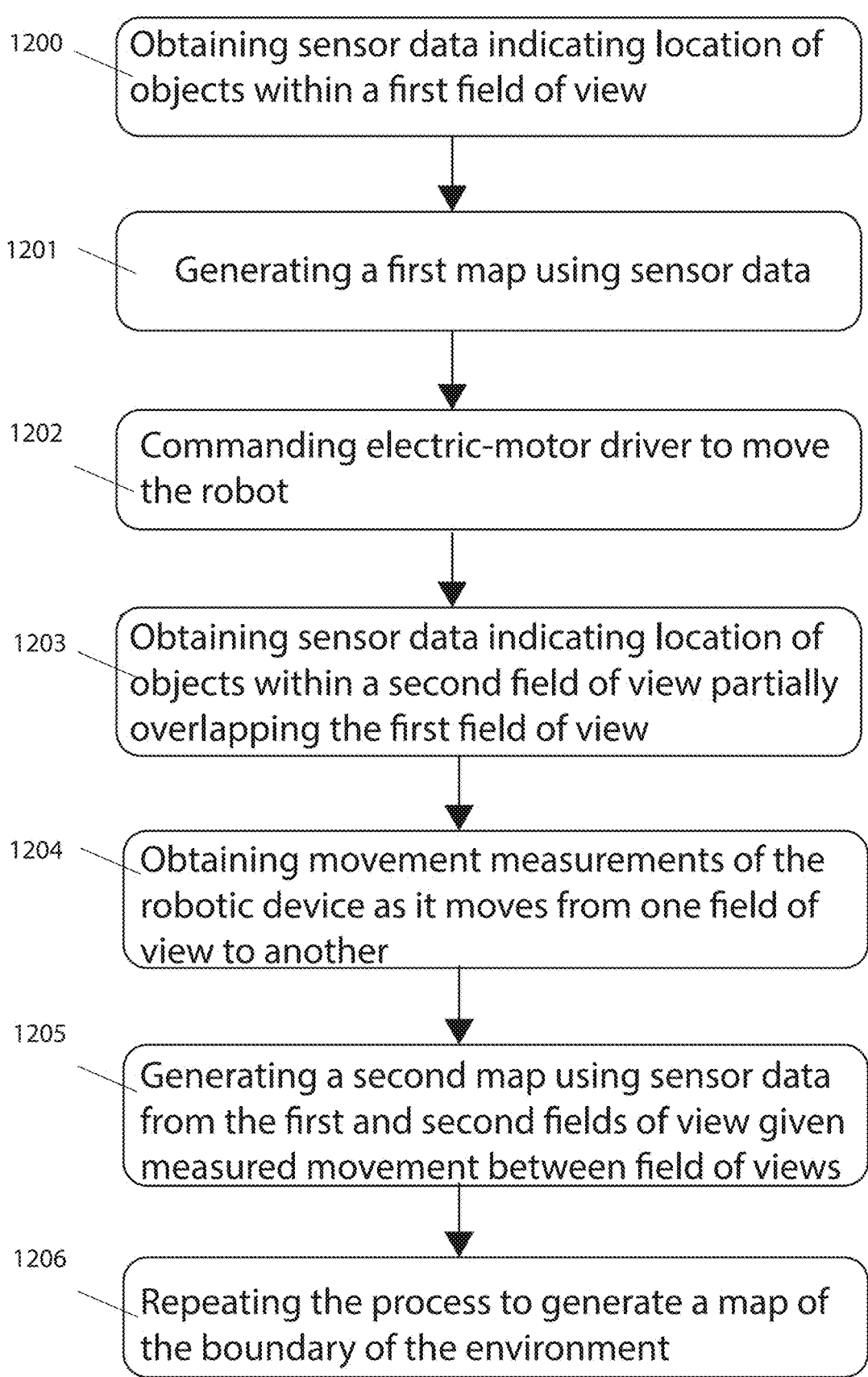

1200 — Obtaining sensor data indicating location of objects within a first field of view 1201 — Generating a first map using sensor data 1202 — Commanding electric-motor driver to move the robot 1203 — Obtaining sensor data indicating location of objects within a second field of view partially overlapping the first field of view 1204 — Obtaining movement measurements of the robotic device as it moves from one field of view to another 1205 — Generating a second map using sensor data from the first and second fields of view given measured movement between field of views 1206 — Repeating the process to generate a map of the boundary of the environment

DISCOVERING AND PLOTTING THE BOUNDARY OF AN ENCLOSURE

CROSS-REFERENCE TO RELATED APPLICATIONS

This application is a Continuation of U.S. Non-Provisional patent application Ser. No. 16/851,614, filed Apr. 17, 2020, which is a Continuation of U.S. Non-Provisional patent application Ser. No. 16/163,541, filed Oct. 17, 2018, which claims the benefit of Provisional Patent Application Nos. 62/573,591, filed Oct. 17, 2017; 62/637,185, filed Mar. 1, 2018; 62/613,005, filed Jan. 2, 2018; 62/599,216, filed Dec. 15, 2017; 62/573,579, filed Oct. 17, 2017; 62/637,156, filed Mar. 1, 2018; 62/740,558, filed Oct. 3, 2018; 62/573,598, filed Oct. 17, 2017; 62/591,217, filed Nov. 28, 2017; 62/616,928, filed Jan. 12, 2018; 62/614,449, filed Jan. 7, 2018; 62/590,205, filed Nov. 22, 2017; 62/666,266, filed May 3, 2018; U.S. Pat. No. 62,661,802, filed Apr. 24, 2018; 62/631,050, filed Feb. 15, 2018; 62/746,688, filed Oct. 17, 2018; 62/740,573, filed Oct. 3, 2018; and 62/740,580, filed Oct. 3, 2018; 62/640,444, filed Mar. 8, 2018; 62/648,026, filed Mar. 26, 2018; 62/655,494, filed Apr. 10, 2018; 62/665,095, filed May 1, 2018; 62/674,173, filed May 21, 2018; 62/688,497, filed Jun. 22, 2018, each of which is hereby incorporated herein by reference.

In this patent, certain U.S. patents, U.S. patent applications, or other materials (e.g., articles) have been incorporated by reference. Specifically, U.S. patent application Ser. No. 15/243,783 (now U.S. Pat. No. 9,972,098), 62/208,791, Ser. No. 15/224,442, 15/674,310, 15/683,255, 15/949,708, 16/109,617, 16/048,185, 16/048,179, 15/614,284, 15/272,752, 16/163,508, and Ser. No. 16/163,562 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

This disclosure relates to computational techniques for processing data related to boundaries of an enclosure, and more particularly, to computational techniques for discovering and plotting the boundary of an enclosure.

BACKGROUND

Autonomous or semi-autonomous robotic devices are increasingly used within consumer homes and commercial establishments. Such devices may include a robotic vacuum cleaner, lawn mower, mop, or other similar devices. To operate autonomously or to operate with minimal (or less than fully manual) input and/or external control within a working environment, mapping methods are implemented within robotic devices such that the robotic device may autonomously create a map of the working environment and subsequently (or concurrently) use it for navigation.

Mapping methods using different measurement systems for robotic devices have been previously proposed. For example, Simultaneous Localization And Mapping (SLAM)

is a mapping method which captures large amounts of feature points to create and continuously update a map of the working environment.

Many SLAM solutions rely on laser distance sensors (LDS) with very high rates of data collection. Such LDS sensors often provide thousands of readings per second in a 360-degrees field of view. Other SLAM solutions such as VSLAM solutions rely heavily on image processing techniques for extracting features such as circles, arcs, lines, and corners from captured images. Images are often processed through multiple stages, usually beginning with simple image filters and then later are processed using algorithms such as corner detection. These SLAM methods frequently have additional stages for probabilistic processing and particle filtering as well, thus, requiring substantial memory for keeping multiple sets of redundant data. These methods are also limited by their poor functionality when operating in areas where the ambient level of light is lower than a certain threshold or in areas with glass walls, as detecting features on transparent or highly reflective surfaces is challenging for the sensors used.

Furthermore, many image processing techniques are computationally expensive, requiring powerful CPUs or dedicated MCUs. This results in robotic devices with SLAM capability to be up to three or four times the cost of ones without such capability. Also, some implemented SLAM solutions require an additional piece of equipment to project an infrared (IR) pattern onto a surface. For example, some products use an additional stationary and external device system that projects an IR pattern onto the ceiling or the environment to determine the position of the robotic device. It is evident that these well-established mapping methods require large amounts of memory, substantial processing power, and high costs for implementation.

Distance sensors may also be used in creating a depth map of the environment. However, in certain cases, the depth maps constructed may be incomplete, containing gaps in areas where information is lacking. The gaps may be due to an opening in the wall, blind spots unseen by the measuring device, or a lack of data resulting from a camera with inadequate detection range. A complete closed loop map of the environment may be necessary to ensure coverage of the entire environment. The majority of distance sensor-based mapping methods do not provide details of a method for identifying and closing gaps in the map after an initial mapping attempt or require the use of additional equipment to close gaps in the map.

None of the preceding discussion should be taken as a disclaimer of any of the described techniques, as the present approach may be used in combination with these other techniques in some embodiments.

SUMMARY

The following presents a simplified summary of some embodiments of the present techniques. It is not intended to limit the inventions to embodiments having any described elements of the inventions or to delineate the scope of the inventions. Its sole purpose is to present some embodiments of the invention in a simplified form as a prelude to the more detailed description that is presented below.

Provided is a robot, including: a chassis; a set of wheels; a plurality of sensors; a processor; a tangible, non-transitory, machine-readable medium storing instructions that when executed by the processor effectuate operations including: generating, with the processor, a map of a workspace of the robot, wherein: the robot carries at least one sensor that senses data indicative of locations of physical objects within a sensed area of the at least one sensor, and the map is generated based at least in part on the data sensed by the at least one sensor in different positions and orientations within the workspace; saving, with the processor, the map of the workspace to a memory of the robot or the cloud; and wherein the robot is paired with a software application executed on a smart phone configured to: display the map of the workspace; and receive at least one input designating a modification to the map of the workspace; a unique tag for a subarea within the map of the workspace; a schedule for cleaning by the robot; an area to avoid; and an instruction to start or stop vacuuming or mopping.

Provided is a method implementing the above-described operations.

Provided is a tangible, non-transitory, machine-readable medium storing instructions that when executed by a processor of a robot effectuate the above-described operations.

BRIEF DESCRIPTION OF THE DRAWINGS

FIG. 12 is a flowchart describing an example of a method for finding the boundary of an environment in some embodiments.

DETAILED DESCRIPTION OF CERTAIN EMBODIMENTS

Figure 1:
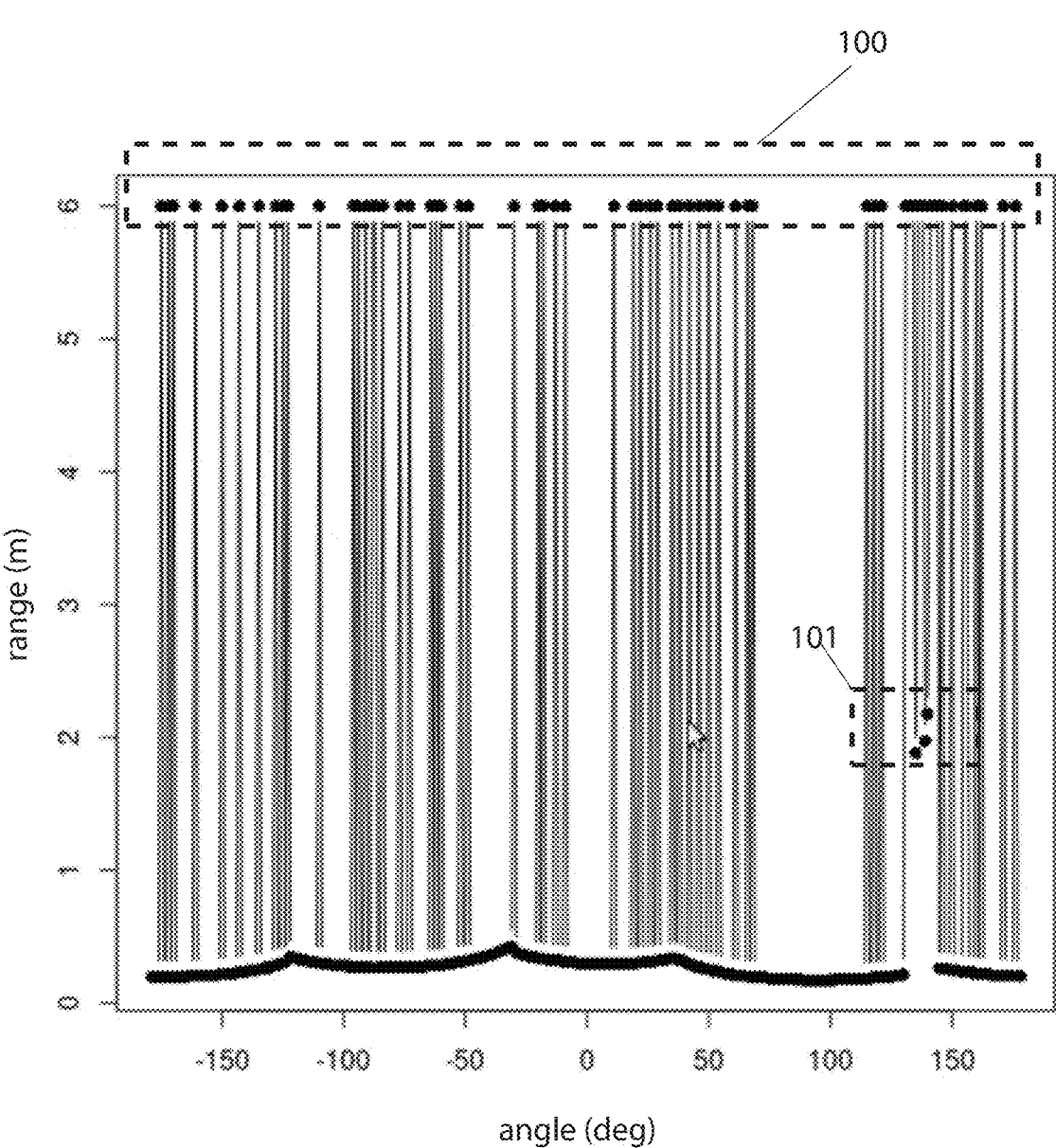
FIG. 1 illustrates an example of a set of readings taken with a depth sensor of a robotic device in some embodiments.

The present techniques will now be described in detail with reference to a few embodiments thereof as illustrated in the accompanying drawings. In the following description, numerous specific details are set forth in order to provide a thorough understanding of the present inventions. It will be apparent, however, to one skilled in the art, that the present techniques may be practiced without some or all of these specific details. In other instances, well known process steps and/or structures have not been described in detail in order to not unnecessarily obscure the present inventions. Further, it should be emphasized that several inventive techniques are described, and embodiments are not limited to systems implementing all of those techniques, as various cost and engineering trade offs may warrant systems that only afford a subset of the benefits described herein or that will be apparent to one of ordinary skill in the art.

Some embodiments discover and plot the boundary of an enclosure by combining readings taken within successively overlapping range of sights using a camera. An enclosure may include a working environment, such as an area that contains objects including, but not limited to (a phrase which is not here or anywhere else in this document to be read as implying other lists are limiting), furniture, obstacles, moving objects, walls, ceilings, fixtures, perimeters, items, components of any of the above, and/or other articles. An enclosure may be closed on all sides or have one or more openings, open sides, and/or open sections and may be of any shape. A camera as described herein may include, but is not limited to, various optical and non-optical imaging devices, like a depth camera, stereovision camera, time-of-flight camera, or any other type of camera that outputs data from which depth to objects can be inferred over a field of view, or any other type of camera capable of generating a pixmap, or any device whose output data may be used in perceiving the environment. A camera may also be combined with an infrared (IR) illuminator (such as a structured light projector), and depth to objects may be inferred from images captured of objects onto which IR light is projected (e.g., based on distortions in a pattern of structured light). Other imaging devices capable of observing depth to objects may also be used, such as ultrasonic, sonar, LIDAR and LADAR devices. Thus, various combinations of one or more cameras and sensors may be used. In some embodiments, gaps in the plotted boundary of the enclosure may be identified by one or more processors of the robotic device and further explored by one or more processors of the robotic device directing the camera until a complete (or more complete) closed loop boundary of the enclosure is plotted. In some embodiments, beacons are not required and the methods and apparatuses work with minimal or reduced processing power in comparison to traditional methods, which is not to suggest that any other described feature is required.

The steps described below may be performed in various settings, such as with a camera installed on a robotic device used to perform tasks, such as floor cleaning, mopping, or lawn mowing, and may be performed by devices such as a drone, and/or other autonomous and semi-autonomous robotic devices. In some cases, the operations are performed by one or more processors on-board of a robot, at a base station of a robot, in a remote data center in communication with a robot, or a combination there, e.g., with some computational acts being offloaded for remote processing.

Some embodiments discover and plot the boundary of an enclosure using at least one camera (e.g., with two or more cameras configured for stereoscopic imaging or light-field imaging). In some embodiments, the method proposed herein is implemented on an ARM Cortex M7 MCU Atmel's SAM S70 processor but other similar devices or other devices that perform similar functionality may be used. In some embodiments, the robot or support infrastructure (e.g., a base station or remote datacenter) may include an application specific integrated circuit (e.g., an AI co-processor ASIC) that cooperates with a physically separate or integrated central processing unit to analyze frames of video (and depth-camera readings) in the manner described herein. In some cases, the ASIC may include a relatively large number (e.g., more than 500) arithmetic logic units configured to operate concurrently on data. In some cases, the ALU's may be configured to operate on relatively low-precision data (e.g., less than or equal to 16 bits, 8 bits, or 4 bits) to afford more parallel computing units per unit area of chip substrate. In some cases, the AI co-processor ASIC may have an independent memory interface (relative to the CPU) to memory, and in some cases, independent memory from that accessed by the CPU. In some cases, the interface may be to High Bandwidth Memory (HBM), e.g., as specified by the JEDEC HBM2 specification, that includes a 3-dimensional stack of dynamic random access memory. In some cases, the memory accessed by the AI-co-processor ASIC may be packed in a multi-chip package with such a 3-dimensional stack of memory, e.g., on a shared package substrate that connects to the CPU via a system board.

In some embodiments, the robot may include an on-board camera, such as one with zero-degrees of freedom of actuated movement relative to the robot (which may itself have three degrees of freedom relative to a working environment), or some embodiments may have more or fewer degrees of freedom; e.g., in some cases, the camera may scan back and forth relative to the robot. Such cameras may include, but are not limited to, depth cameras, such as stereo or structured light depth cameras, stereo vision cameras, or various other types of camera producing output data from which the environment may be perceived. In some embodiments, a time-of-flight camera may determine distance based on time required for light transmitted from the robot to reflect off of an object and return to the camera, from which distance to the object can be inferred. Distance measurements to objects may also be estimated (or otherwise perceived) by capturing images of the objects from a moving camera, e.g., with structure from motion techniques. Distance can also be measured using an IR illuminator for projecting IR light onto objects within the enclosure, combined with a camera to capture images of the projected light. The camera may be positioned at an angle with respect to a horizontal plane and/or vertical plane and/or the IR illuminator or may be positioned with no angle at all. The IR illuminator may be positioned at an angle with respect to a horizontal plane and/or vertical plane and/or the camera or may be positioned with no angle at all.

In some embodiments, an image processor (e.g., an on-board image processor) processes the captured images. The light projected by the illuminator may be in the form of points structured in a 3D configuration or a line or any other structured light pattern. For example, in some embodiments, a line laser may be coupled with a camera and an image processor. The line laser may be positioned at a downward angle with respect to a horizontal plane and projects a laser line onto objects within the enclosure. The camera captures images of the laser line that is projected onto objects. Projected lines may appear larger as the distance to the surface on which the line laser is projected increases and will appear smaller as this distance decreases. Additionally, projected lines may appear lower as distance to the surface on which the line laser is projected increases as the line laser diode is angled downward with respect to the work surface plane. Alternatively, the line laser may be positioned at an upward angle with respect to a horizontal plane where projected lines will appear higher as the distance to the surface on which the line laser is projected increases. If the laser and camera are not positioned at an angle with respect to a horizontal and vertical plane, the camera may still capture images of the projected light as the narrow cone shaped field of emission of the laser and the wide cone shaped field of view or range of sight of the camera will eventually overlap but at a further distance. In this configuration, the minimum distance of detection will be larger. The laser emitter may be a straight line or two or more dots. The structure of the laser light may be adjusted with lenses. Some embodiments may use a grid dot pattern while others may use more sophisticated arrangement of dots, lines, and geometrical shapes. The lens may be flat in some areas and have curvature in other parts. The curvature may vary on the lens such that the movement of the structured light on the image follows certain logic or patterns.

The movement of the laser light on the captured image need not be linearly correlated with distance, so functions or tables relating movement of the laser light to distance of the object can be constructed to approximately associate bright pixel movement in the image with distance of the obstacle. This may provide a varied resolution as the distance to obstacle decreases or increases. However, a lens that has more than one curvature may mitigate this issue in a similar way as bifocal glasses that can be used for both near and distant vision. The structured light may contain features that can be tracked in consecutive pictures taken by the camera and analyzed as the camera moves in the environment to determine distance to obstacles.

In some embodiments, a set of points ordered in a line may be generated in an image. Each point may represent a distance to an obstacle for a given angle relative to the robot. For example, a 90-degree field of view with one degree angular resolution would yield 90 points and the first point would represent the distance to the obstacle at one degree while the last point would represent the distance to the obstacle at a 90-degree angle. Other configurations may also be used. For example, in some embodiments, a line laser may be used and points along the length of the line may represent a distance to an obstacle for a given angle. For example, a line laser may be generated and, for a 90-degree field of view at angular resolution of one degree, 90 points in the line can be considered in determining the distance to an obstacle. In some embodiments, the image processor determines distance based on various factors, such as the position, size, density, and/or color depth of the bright pixels of the laser line or any structured light. The position and size of the laser line or structured light may be determined using pixmap output from the camera, for example.

Various filters can be used to smooth pixel readings. For example, a median of a combination of pixels within a threshold distance in pixel space can be used instead of using each pixel individually. Other software filters can be used to extract the line or dots or any other structured light from the image and separate it from surrounding noise and light. For example, to identify a line laser within an image, the filter may search for columns where only a single bright area is observed and for bright areas that do not exceed more than a certain number of pixels in width. A depth or breadth search can be implemented to determine which of the consecutively connected bright points in a column are likely to be the line laser and which ones are likely to be noise. In addition to search algorithms, the relationship between light points in different columns can be used to produce more accurate and noise free readings. A low or high pass filter or a combination of physical filters may be used to allow a particular wavelength inside the camera imager to reduce noise. For example, if a 920 nm laser is being used, other spectrums may be filtered out. In some embodiments ambient light is used instead of active illumination. Alternative forms of active illumination identify a structure or pattern in a captured image and analyze the change of dimensions, shape or position and the relationship between the pattern or structure and the recorded odometry. Given the resolution of the camera and odometry or inertial information providing displacement in the real world, the change in size, shape, or position of the identified pattern or structure in the image as the robot moves can be inferred and ultimately used to infer distance to the surroundings. In other embodiments, a time of flight sensor, commonly having a narrow angular measurement range, may be used to identify the distance to objects at one or two angles. This information may be combined into the image captured, along with the features in the image, and extrapolated into a larger field of view (i.e. angular range of sight of an image).

In some embodiments, a range of certainty in the measurements can be provided for each measurement. For example, in the a 90-degree field of view, readings falling within the middle region of the field of view may be more accurate than those closer to the limits of the field of view. Readings taken from different distances may have different certainties or resolutions. More reflective areas may provide brighter points than less reflective areas. This may affect the level of certainty of measurements. Certain surrounding conditions, such as ambience light, may provide more confidence in the readings. In extremely bright environments, statistical and Bayesian methods may be used to filter out the noise whereas in darker environments it may be less computationally complex to identify bright points within the image.

In some embodiments, based on data acquired by a camera installed on a robotic device, embodiments take distance measurements from the camera to objects within the enclosure. In some embodiments, distance measurements are taken within successively overlapping fields of view of images as the robotic device moves within the enclosure such that overlapping distance measurements can be combined to plot the boundary of the enclosure. In some embodiments, distance measurements are grouped into images, e.g., with different measurements of distance corresponding to different distances at different angular positions taken in successive images, or in some cases, distance data is not discretized in images. In some embodiments, gaps in the plotted boundary of the enclosure are identified and further explored by the robotic device with mounted camera until a complete closed loop boundary of the enclosure is constructed. A complete loop enclosure may not be feasible in certain situations. In some embodiments, the robot starts working in the discovered enclosure while trying to discover new areas.

In some embodiments, the information perceived by the camera may be processed and translated into distance measurements and reported in a human readable measurement unit, such as millimeter or inches, for visualization purposes, or some distance measurements may be processed in non-human readable form, e.g., as binary data that is not scaled to a recognized measurement standard. When the raw data of the perceiving device are directly used by an AI algorithm, the extra translation steps may be bypassed and raw data may be directly used by the algorithm, where raw values and relations between the raw values are used to perceive the environment and plot the boundary directly without converting raw values to distance measurements with metric or imperial units. "Raw data" may undergo some processing from the values sensed by transducers of a camera, e.g., to determine a distance image. For example, in some embodiments, where a camera coupled with an IR laser is used in perceiving the environment, distance may be inferred based on the position and/or size of the projected IR light in the image captured. A pixmap from the camera may be used to detect the position and size of IR light in the image by identifying pixels with high brightness. The pixmap may be used directly in representing the boundary based on the position of pixels with high brightness. In the case of two overlapping images, the area in which the two images overlap may contain a similar arrangement of pixel intensities in the pixmap. This similar arrangement of pixels can be detected and the two overlapping images can be stitched at the overlapping area to create the boundary of the enclosure without processing the raw data into distance measurements. Accordingly, some embodiments do not require that raw data collected by the perceiving device be translated into distance measurements in a human recognizable format or other processed data. The process of stitching images may use a variety of methods to, for example, find overlapping points and/or the best alignment between images and stitch images together. For example, the one or more processors of the robotic device may use pixel patterns and/or features and/or patterns of columns, rows, and/or curves with high brightness (to which ares or lines may be fitted) (e.g., to determine overlapping points of similarities between two different images), least square method, movement measurements of the robotic device (e.g., from a gyroscope and/or optical encoder), speed over ground (SOG), sum of triangles, values of distance measurements, Mahalanobis distance, and/or other analytical methods.

In some embodiments, all readings taken within fields of view are stitched together by the processor to construct a map of the environment. In some embodiments, only a portion of the readings taken within fields of view are stitched together by the processor, such as the portion of readings only coinciding with the boundary of the environment to construct a boundary map. For example, in the case wherein an inverse sensor model is used and the processor assigns each cell of a grid map of the environment (a probability that it is occupied), only cells with high probabilities (e.g., cells occupied by perimeters and/or obstacles) are stitched together by the processor. In embodiments, a map filler is used by the processor to fill the area within the stitched perimeter.

In some embodiments, robots or robotic devices may include one or more autonomous or semi-autonomous devices having communication, an actuator, mobility, and/or processing elements. For example, a robot or robotic device may include a casing (like a shell), a chassis, a set of wheels, a motor configured to drive the wheels, a receiver that acquires signals (transmitted from, for example, a transmitting beacon in the workspace), a processor (like a controller that processes and/or controls motor and other robotic operations), network (e.g., wireless) communications, power management, etc., and/or one or more clock or synchronizing devices. In some embodiments, a robot may further include movement sensors, such as an odometer, inertial measurement units (like with a three axis accelerometer and a three axis gyroscope), and/or optical flow sensor (e.g., a visual odometry sensor facing the ground), and the like.

In other embodiments, structure from motion techniques may be implemented to measure movement. A gyroscope sensor, for example, comprises a small resonating mass that shifts when rotation is initiated or speed of rotation changes. The movement of the mass induces an electrical signal that may be read by a controller and converted or other processing module into an angular velocity or other measurements indicating speed, acceleration, and/or direction of movement. In further embodiments, the gyroscope sensor may be used to measure rotational movement. An odometer sensor, for example, may determine the distance (or path, e.g., in vector form with both distance and direction) travelled by counting the number of wheel rotations. Given the diameter of the wheel, the distance travelled can be calculated. An odometer can therefore be used to measure translational or rotational movement. In some embodiments, optical flow and structure from motion techniques measure movement using images and/or data derived from images. Motion may be estimated based on changes in the features, such as lighting, of consecutive images captured as the camera moves relative to objects in the environment.

Some embodiments discover the boundary of an enclosure, e.g., by plotting the boundary using at least one camera. Distance measurements to objects within an environment may be estimated by capturing images of the objects from a moving camera, known as structure from motion (SfM). In some embodiments, distance can be measured using at least one IR illuminator to project IR light onto objects within the enclosure and at least one camera, positioned at an angle with respect to a horizontal plane or the IR illuminator, to capture images of the projected light.

Other configuration are also contemplated where, for example, the IR illuminator or both the camera and IR illuminator are positioned at an angle with respect to a horizontal plane. The camera and IR illuminator may be oriented in such a way to achieve desired output. Charge coupled device (CCD) or complementary metal oxide semiconductor (CMOS) cameras capable of observing IR light may be used. A line laser may be coupled with a camera and image processor. The line laser may be positioned at a downward angle with respect to a horizontal plane and projects a laser line onto objects within the enclosure. The camera may capture images of the laser line projected onto objects. Projected lines will appear larger as the distance to the surface on which the line laser is projected increases and will appear smaller as this distance decreases. Additionally, projected lines will appear lower as distance to the surface on which the line laser is projected increases as the line laser diode is angled downward with respect to the work surface plane. The image processor determines distance based on the position and size of the laser line. Alternatively, two point lasers may be used and the distance between the two projected points is used to infer depth or two image sensors may be used and the displacement of laser point from one image to the other is used to infer depth. A pixmap from a camera may be used to detect the position and size of IR light by identifying pixels with high brightness from which distance may be inferred. The pixmap may be used directly in representing the boundary based on the position of pixels with high brightness. In other embodiments, distance may be inferred from time-of-flights recorded and used directly in representing the boundary of an enclosure or may be processed and translated into distance measurements. In further embodiments, the perceiving device measures vectors connecting the perceiving device to objects within the environment and calculates the size of the vectors using the L2 norm, thereby giving the distance to objects.

In some embodiments, the raw data perceived by the depth perceiving device may be processed and translated into distance measurements, reported in a human-readable standardized measurement unit, such as millimeter or inches, for visualization purposes. For example, raw data provided by a time-of-flight camera may include time required for light to reflect off of a point on an object and return back to the camera. In the case where a camera and two IR point lasers are used, raw data may be pixmap containing pixel intensities from which the position of projected points can be determined and used to infer depth. Raw data may be provided in matrix form or in ordered list. In some embodiments, processing steps may be bypassed and raw readings may be directly used by an algorithm, where raw values and relations between the raw values are used to perceive the environment and plot the boundary directly without converting raw values to distance measurements with metric or imperial units. For example, rather than compare distance measurements taken within two overlapping range of sights to find overlapping points, raw data, such as time-of-flight measured for multiple points within each range of sight, can be compared and used to find the overlapping points without translating the raw data into distance measurements. Overlapping raw data may be combined in a similar manner as that described below for combing overlapping distance measurements. In some embodiments, raw data (e.g., sensed information from which depth or other information has not been inferred), such as time required for a light or sound pulse to reflect off of an object or pixel intensity may be used directly (e.g., without first inferring depth) in creating a map of an environment, which is expected to reduce computational costs, as the raw data does not need to be first processed and translated into depth values, e.g., in metric or imperial units. Some embodiments, thus, do not require the processor or controller to translate raw data into distance measurements.

In some embodiments, a camera, installed on a robotic device, for example, is used to measure the distance from the camera to objects within a range of sight. The robotic device together with the mounted camera moves to observe a second range of sight partly overlapping the first range of sight. As the robotic device moves to observe the second range of sight the values of distance measurements taken within the first range of sight may be adjusted to account for the movement of the robotic device. The camera is then used to measure the distance from the camera to objects within the second range of sight. The distance measurements taken within the second range of sight may be compared to those taken within the first range of sight in order to find the overlapping area between the two range of sights. An area of overlap between the first range of sight and the second range of sight may be determined when a number of consecutive measurements from the first range of sight and the second range of sight are similar. In some embodiments, the area of overlap between distance measurements taken within the two range of sights is estimated based on the measured movement of the robotic device and is used as a method of verifying the identified area of overlap. It may also be used as the primary method of identifying the area of overlap. In this embodiment, devices such as an odometer, gyroscope, and optical flow sensor may be used to measure movement. For example, the angular displacement provided by an odometer and gyroscope and/or the mathematical convolution of the two may be used to estimate the area of overlap.

In some embodiments, images maybe obtained, aligned, and otherwise processed with the techniques described in U.S. patent application Ser. No. 16/048,179, titled METHOD AND APPARATUS FOR COMBINING DATA TO CONSTRUCT A FLOOR PLAN, filed 27 Jul. 2018, the entirety of the contents of which are hereby incorporated by reference.

In some embodiments, a time-series of depth-related data, like a sequence of images, is obtained by the robot, e.g., as the robot or camera moves through the working environment. In some cases, some measurements (e.g., images) may be captured from different poses of the robot or camera in the working environment. Some embodiments may pair movement measurements (e.g., a sequence of vectors of movement) with the images corresponding to those movements, e.g., an image take before or after the movement, in some cases, associating the gap between sequential images with the set of movement vectors of movements that occurred between time stamps of the images.

In some embodiments the readings from the odometer, gyroscope and optical sensor may be combined to produce more accurate readings, e.g., with data fusion techniques and a Kalman filter. Gyroscopes and odometers provide similar readings (e.g., in vector form indicating magnitude of distance and direction). However, since each measurement device is subject to a different type of noise and different errors, combining readings from both measurement devices through a mathematical process can produce more accurate readings. In some embodiments, a first set of readings taken by a first measurement device is fixed and used as a reference while a second set of readings taken by a second measurement device is transformed to match the fixed reference. In some embodiments, the transformed set of readings is combined with the fixed reference and used as the new fixed reference. In another embodiment, only the previous set of readings is used as the fixed reference. Initial estimation of a transformation function to align the second set of readings to the fixed reference is iteratively revised in order to produce minimized distances from the second set of readings to the fixed reference. The transformation function may be the sum of squared differences between readings matched from the second set of readings and the fixed reference. For example, in some embodiments, for each value in the second set of readings, the closest value among the first set of readings is found. In a next step, a point to point distance metric minimization technique is used such that it will best align each value in the second set of readings to its match found in the first set of readings of the fixed reference. One point to point distance metric minimization technique that may be used, for example, estimates the combination of rotation and translation using a root mean square. The process is iterated to transform new readings using the obtained information. In some embodiments, the gyroscope may be the first measurement device used to take the first set of readings and the odometer the second measurement device used to take the second set of readings or vice versa. Other types of readings may be combined in a similar manner. For example, structure from motion or optical flow may be used in combination with odometry or inertial measurement unit (IMU) or both.

Other methods for combining the two sets of readings may also be determined by embodiments and used as an aggregate measure of movement. For example, the processor of the robotic device may average overlapping readings (or may determine some other measure of central tendency like a median or mode value) or use the minimum sum of error or minimum mean squared error to adjust overlapping readings. As a further example, the processor of the robotic device may use a k-nearest neighbors approach whereby a reading is taken as the average of its k-nearest neighbors. In some cases, the processor may further process readings using mathematical methods such as split and merge algorithm, incremental algorithm, Hough Transform, line regression, Random Sample Consensus, Expectation-Maximization algorithm, or curve fitting. In some embodiments, mathematical adjustment applied to overlapping readings from the gyroscope and odometer is applied to all readings within the combined data. In some embodiments, the combined readings from the gyroscope and odometer may be further combined with data from other measurement devices. In certain instances, there may be readings among the two sets of readings combined that have very distant values from the majority of readings within the two sets of data. Some embodiments may filter outlier readings that, e.g., indicate faster than a threshold speed of travel between consecutive readings, for instance, faster than 10 meters per second or faster than 100 meters per second, due to spurious readings.

In some embodiments, one or more processors identify the area of overlap between two sets of raw data captured within overlapping range of sights by recognizing similarities between the two sets of data. For example, two overlapping images may contain an area in which pixels overlap, containing a similar arrangement of pixels. The one or more processor may detect this similar arrangement of pixels between the two overlapping images to find the area of overlap. As a further example, one or processors may find a consecutive number of similar depth measurements or optical (or other signal) intensities in both sets of data to identify the area of overlap. Overlap may be detected in depth measurements or in other images, such as those upon which depth measurements are based. This technique, combined with the movement readings from the gyroscope or odometer and/or the convolved function of the two can be used to infer a more accurate area of overlap than approaches that only use one of these sources of data. The one or more processors may then merge the two range of sights together based on the area of overlap, e.g., by translating pixel coordinates of one image with one origin into pixel coordinates of the other image based on differences between the origins of the two images.

The values of overlapping distances from two successive range of sights may be slightly different due to noise. In such cases, a moving average, minimum sum of errors, or any other suitable method may be applied to the overlapping distance measurements from two or more overlapping range of sights to calculate new values for the depth measurements in the overlapping area. Additional methods may be used to process overlapping depth measurements and calculate new depths for the overlapping area, such as split and merge algorithm, incremental algorithm, Hough Transform, line regression, Random Sample Consensus, Expectation-Maximization algorithm, or curve fitting. In some embodiments, one or more processors use k-nearest neighbors algorithm and in some cases only apply the algorithm to overlapping depth measurements with discrepancies. In other embodiments, one or more processors apply density-based spatial clustering of applications with noise (DB-SCAN) to depth measurements (or differences thereof between consecutive images) to identify clusters of depth measurements belonging to the same area of an object. In some embodiments, one set of data is considered a fixed reference and another set of data is transformed to align with the fixed reference using a transformation function. The one or more processors iteratively revise the transformation function as new data is observed to obtain minimized distances between closest matching points from the newly read data and fixed reference. A point to point distance metric minimization technique that may be used estimates the combination of rotation and translation using a root mean square. The processing techniques described herein may be used independently or in combination. In some embodiments, the adjustments that one or more processors apply to depth measurements within the area of overlap are applied to depth measurements beyond the area of overlap. This method is repeated such that distance measurements taken within successively overlapping range of sights can be combined to construct the plotted boundary of the enclosure.

In some embodiments, two classes of sensors are used, one acting as a predictor and the other confirming perimeter points of a work space. The predictor sensor predicts a specific coordinate as a perimeter point. The second set of sensors may either confirm or refute the prediction. For example, a predicted coordinate is proven to be false if the second set of sensors detects the robot occupying the area within which the coordinate is found. If the second set of sensors detects that coordinate is within an area the robot cannot access, the prediction is found true. In some embodiments, this is implemented with a low range sensor array. The second set of sensors may be, but is not limited to, a low range of IR sensors, distance sensor, tactile sensor, a bumper sensor, or other similar types of sensors.

In some embodiments, the plotted boundary may be stored in memory of and used by the robotic device to perform tasks within discovered areas of the enclosure. As the robotic device performs a task, it marks the areas covered within the plotted boundary (e.g., in memory) to avoid repeat coverage. While the robot performs work in discovered areas, it continues to take distance measurements and merge them with the existing plotted boundary to close any gaps in the boundary that may exist and, in the process, may discover previously undiscovered areas. In some embodiments, the discovered area is split into sections that are covered by the robotic device in succession starting from the section closest to the robotic device and ending at the sections furthest away. Any other order may be acceptable depending on the situation. After covering discovered areas within the enclosure, the robotic device identifies any remaining gaps in the plotted boundary that may have not been closed while performing work in the discovered area. These gaps may be due to, for example, an opening in the wall, such as in the case of a door or an opening between separated areas, blind spots unseen by the measuring tool, or a lack of data resulting from a measuring tool with inadequate detection range.

In some embodiments, the robotic device moves towards the undiscovered area within which a first gap is located while continuously taking distance measurements of the undiscovered area and merging the measured distances taken within overlapping successive range of sights together at the area of overlap between successive range of sights.

Some embodiments may interrogate a map in memory of the workspace constructed based on measured distances from aligned images in order to detect undiscovered areas. An area may be designated as undiscovered if no data, less than a threshold amount of data, or data of less than a threshold confidence, exists in a particular region. Thus, undiscovered areas may be distinguished from open areas by measurements being taken in an area by the robot.

The robotic device may continue to explore undiscovered areas within which the gap is located by taking distance measurements and combining them with previously taken distance measurements until the gap no longer exists (e.g., measurements with greater than a threshold spatial resolution are obtained). During exploration of undiscovered areas within which gaps are located, the robotic device may perform work (e.g., clean) in new areas discovered. If it does perform work, areas covered may be marked in order to avoid repeat coverage. In some embodiments, the processor of the robotic device may split the newly discovered areas into sections and the robotic device may successively cover each section one at a time. The robotic device continues to explore unrecognized areas in the plotted boundary within which gaps are identified until no gaps exist and the plotted boundary is a complete closed loop. While doing so, the robotic device (also referred to as a "robot" herein) may also perform work in all newly discovered areas. In some embodiments, the robotic device explores undiscovered areas within which gaps are identified in the plotted boundary before performing work in discovered areas within the plotted boundary. In some embodiments, the robotic device uses marked areas within the plotted boundary of the enclosure to determine whether to cover marked areas again based on the path of the robotic device, user settings, and/or its coverage algorithm.

In some embodiments, after exploring undiscovered areas within which identified gaps are located and covering all discovered areas within the plotted boundary, the robotic device moves along the boundary of the enclosure while using sensory devices, such as tactile sensors (like bump sensors) or short-range IR sensors, facing towards the boundary of the enclosure to verify that no additional gaps exist. For example, the robotic device may use the tactile sensor to observe physical contact between the robotic device and the boundary as it follows along the boundary of the enclosure to ensure no additional gaps exist. In some embodiments, an additional gap may be observed while following along the boundary, in which case the robotic device may proceed to explore (e.g., position its sensors such that it can image) the undiscovered areas while mapping newly discovered areas as described above. In some embodiments, the robotic device returns back to its home base after moving along the boundary to check that no additional gaps exist. In some embodiments, the actions of covering internal areas within the enclosure and moving along the boundary can alternate. For example, the internal areas of one room can be covered and movement around the boundary completed before moving on to the internal area and boundary of a second room. In other embodiments, the location of the boundary sensed may be compared to the location of the boundary plotted to check for accuracy. For example, using a tactile sensor, the location at which physical contact between the robotic device and boundary are observed can be compared to the corresponding location within the plotted boundary to check if there is a coinciding boundary plotted. This method may also be used to determine ground truth of the location of the boundaries in comparison to the perceived location of the boundaries. In some embodiments, ground truth may be used to adjust measurements or the plotted boundary. The robotic device may move along the boundary and compare its sensed position to that of the plotted boundary at any time during or after the process of plotting the boundary of the enclosure.

In some embodiments, where the gap in the plotted boundary is due to an opening in the wall, when for example, there is a doorway or an opening between two separate areas, exploration of the undiscovered areas within which the gap is identified can lead to the discovery of a room, a hallway or any other separate area. During exploration of undiscovered areas, the camera continues to measure distances to objects within its range of sight such that newly discovered areas, such as a room, hallway, or any other area, are added to the plotted enclosure by combining new distance measurements with the plotted boundary at overlapping points. In some embodiments, identified gaps that are found to be, for example, an opening in the wall are used in separating areas into smaller subareas. For example, the opening in the wall between two rooms may be used to segment the area into two subareas, where each room is a single subarea. This could be expanded to five rooms, for example, where each room separated from rooms adjacent to it by an opening in the wall may be segmented into five subareas using the openings in the walls as dividers. In some embodiments, the processor of the robotic device provides a unique tag to each subarea and uses the unique tag to order the subareas for coverage by the robotic device, choose different work functions for different subareas, add restrictions to subareas, set cleaning schedules for different subareas, and the like. In some embodiments, the processor uses reinforcement learning to determine the best division of the environment and order of coverage of the subareas. Such techniques are further described in U.S. Patent Application 62/666,266 and Ser. No. 15/619,449, the entirety of the contents of which are incorporated herein by reference. In other embodiments, the processor divides the environment into subareas by first identifying open-ended boundaries in the map due to, for example, an opening in the wall. Using the map, the processor measures the distance from a point at the open-ended limit of the boundary to objects within the environment at predetermined angular increments from 0 to 360 degrees. In some embodiments, all distances corresponding to angular increments within a particular range (e.g., 270-360 degrees, 90-180 degrees, etc.) are compared, and the lines connecting the open-ended limit of the boundary to the point corresponding to the minimum and maximum distances are used to segment the area. The range considered depends on the map. Further details of this method of segmenting an environment into subareas are described in U.S. Patent Application 62/590,205, the entirety of the contents of which are incorporated herein by reference.

In some embodiments, the subareas may be merged to create larger areas. This may depend on the size of the subarea or other factors such as floor types and other environmental parameters. For example, two small subareas that have different floor types may not be merged together. It is also possible that user feedback is used to combine smaller subareas into larger ones or to split larger subareas into smaller ones. Each subarea may be treated independently, such that the robotic device may be programmed to operate and execute tasks within a particular subarea. For example, the robotic device may be programmed by the user to execute one type of coverage algorithm in one subarea while another type of coverage algorithm is used for all other subareas or the robotic device may be programmed to only clean certain subareas or the robotic device may be programmed to cover subareas at particular times. In some embodiments, the robot may determine the coverage algorithm that is necessary for each subarea based on parameters such as flooring type, level of work needed, map and boundary data, etc. In some embodiments, the subareas may each be assigned a unique tag, such as a number or any type of label. The tag assigned to each subarea may be used in setting and controlling the operation and execution of tasks within each subarea, where for example, tasks such as cleaning (including different types of cleaning) may be programmed for subareas with specified tags or tags may be used to schedule tasks for different subareas at particular times. In some embodiments, the unique tags assigned to subareas are used in setting the order of coverage of each subarea by the robotic device. In some embodiments, the order of coverage of the subareas is such that repeat coverage of areas by the robotic device is minimized. In another embodiment, the order of coverage of the subareas is such that coverage time of the total area by the robotic device is minimized. The order of subareas can be changed depending on the task or desired outcome. One or more processors of the robotic device may use an algorithm, such as Markov Decision Process (MDP), to monitor and optimize actions of the robotic device given a desired outcome, such as minimizing cleaning time. For example, the one or more processors of the robotic device may apply MDP to optimize in an iterative manner, for example, the division of space into different subareas or the order of covering different subareas. This process is mathematically represented by MDP consisting of a sequence of states and actions followed by rewards. Actions are taken to transition from one state to another and after transitioning to each new state a reward is assigned. For a sequence of states and actions, the net return or reward is the sum of rewards received for the sequence of states and actions, with future rewards discounted. The expected net return for the execution of a sequence of states and actions is given by a state-action value function. Optimal state-action value function may be found by identifying sequence of states and actions with the highest net return. Since multiple actions can be taken from each state, an optimal policy may also be found that contains the action from each state with highest reward value. Consider a sequence of states(s) and actions (a) followed by rewards (r):

$$s_t, a_t, r_{t+1}, s_{t+1}, a_{t+1}, r_{t+2}, s_{t+2}, a_{t+2}, r_{t+3}, \ldots r_T, s_T, a_T$$

The net return $R_T$ to be expected in the future is the sum of the rewards received for the sequence of states and actions beginning from state $s_t$ and ending with terminal state $s_T$. This is mathematically represented by:

$$R_T = r_{t+1} + \gamma^1 r_{t+2} + \ldots + \gamma^{T-t-1} r_T$$

where $0 \leq \gamma < 1$ is a discount factor applied as distant rewards are less important. The value of a state-action pair Q (s, a) is defined as equivalent to the expected return $R_T$ for the sequence of states and actions beginning with state $s_t$ and action $a_t$ and ending with terminal state $s_T$.

$$Q(s,a) = E[R_T | s_t = s, a_t = a]$$

By finding the sequence of actions which maximize the state-action value function Q (s, a), the optimal value function Q* (s, a) is identified:

$$Q^*(s,a) = \max E[R_T | s_t = s, a_t = a]$$

And the optimal policy for each state can be derived by identifying the highest valued action that can be taken from each state.

$$\pi^*(s)=\text{argmax } Q^*(s,a)$$

To iteratively calculate the value function as actions within the sequence are executed and the robotic device transitions from one state to another, the Bellman Optimality equation may be applied. The optimal value function obeys Bellman Optimality equation and can be expressed as:

$$Q^*(s_t,a_t)=E[r_{t+1}+\gamma \text{ max } Q^*(s_{t+1},\alpha_{t+1})]$$

The equation expresses that the value for a given state $s_t$ and action $a_t$ should represent the current reward $r_t$ observed for state $s_t$ plus the maximum discounted $\gamma$ future reward expected for the next state $s_{t+1}$ the robotic device would end up in. The one or more processors of the robotic device may use this equation to iteratively calculate the state-action value for a given state $s_t$ and action at.

$$Q_{i+1}(s_t,a_t)=E[r_{t+1}+\gamma \text{ max } Q_i(s_{t+1},\alpha_{t+1})]$$

In some embodiments, the sequence of states and actions may correspond to, for example, the states the robotic device visits and actions it takes while covering subareas in a particular order from start to finish. Over time, as the robotic device visits more states and as it evaluates different actions from each state, the system will converge to find the most optimal action to take from each state thereby forming an optimal policy. Further, as the processor of the robotic device evaluates different sequences of states and actions, i.e. different order of coverage of subareas, over time, the system will converge to the most optimal sequence of states and actions.

In some embodiments, wherein the robotic device detects a second room beyond an opening in the wall detected within a first room being covered, the opening in the wall between the two rooms is identified as a doorway. In such embodiments, to identify the doorway connecting the two rooms, the robotic device may cover the internal space within the first room, but remain distanced from the boundaries detected. The robotic device may then cover (e.g., with a serpentine coverage path or other paths) the internal space within the first room again but this time reach closer to the boundaries detected. The robotic device may record covered areas. For example, the robotic device may mark areas covered within a map or record coordinates corresponding to areas covered. The distance between the outer edge of the recorded first internal space covered and areas of the recorded second internal space covered are determined, where the distance measured is perpendicular to the outer edge of the first internal space. In some embodiments, recorded areas of the second internal space covered that are below a threshold distance may be discarded and any remaining recorded areas of the second internal space may be referred to as an outside space. The centroids of the recorded outside spaces and the recorded first internal space covered may be determined and path lines between centroid of the first internal space and centroids of outside spaces may be created. The segments of the path lines passing through the internal space and outside spaces are discarded leaving only path lines connecting the outer edges of the internal space to the outer edges of the outside spaces. The one or more processors of the robotic device may then mark openings in the wall as a doorway using an iterative process where a theoretical doorway line perpendicular to each path line is fitted to boundary data. At each iteration, a doorway line moves further along a corresponding path line, beginning closer to the internal space, until the doorway line aligns with the boundary data, at which point the doorway line is identified as a doorway. In some embodiments, the line of sight of the robotic device is limited and only a small area beyond the opening in the wall is discovered. In such cases, the robotic device moves closer to the opening in the wall and scans to discover enough area and hence collect more data beyond the opening in the wall before deciding to initiate the steps described for identifying a doorway. In some embodiments, walls are geometrically modeled as a line and an opening in the wall is detected by a deviation in depth data from a line fitted to the depth data, where depth data beyond a deviation threshold is considered to be an opening in the wall.

In some embodiments, a depth sensor of the robotic device outputs range and light intensity for every reading taken such that the number of readings taken at a single time point depends on the angular resolution of the depth sensor and the size of the field of view. For example, a reading may be taken every 0.5° or every 2° for a 100° field of view resulting in 200 or 50 readings at a single time point, respectively. If more than one set of readings is taken for a particular field of view, the processor averages the data for each angular resolution. Since depth sensors have a minimum and maximum detectable range, invalid and undefined readings may result from out of range measurements (i.e. those too far or too close to the depth sensor). To eliminate these undefined values, the processor assigns them a large number and filters them out from the measurements of the environment. In embodiments, the processor also filters out outliers due to noise, corrupt data, etc. For example, FIG. 1 illustrates readings taken by a depth sensor for a particular field of view. Data points 100 with value of 6 meters, the maximum range of the depth sensor, are considered invalid data points resulting from out of range data and are filtered out by the processor. Remaining data points are fitted to a line model and any deviation from the line model are identified as an opening in the wall by the processor. Data points 101, for example, are identified by the processor as a deviation from a line model and are considered an opening in the wall. In embodiments, the range and light intensity recorded by the depth sensor for each reading is used by the processor to calculate an error associated with deviation of the range data from a line model. The processor of the robotic device relates the light intensity and range of a point captured by the depth sensor using:

$$I(n) = \frac{a}{r(n)^4}$$

wherein I(n) is the intensity of point n, r(n) is the distance of the particular point on an object and a is a constant that is determined by the processor using a Gaussian assumption.

$$a=E(I(n)r(n)^4)$$

Figure 2:
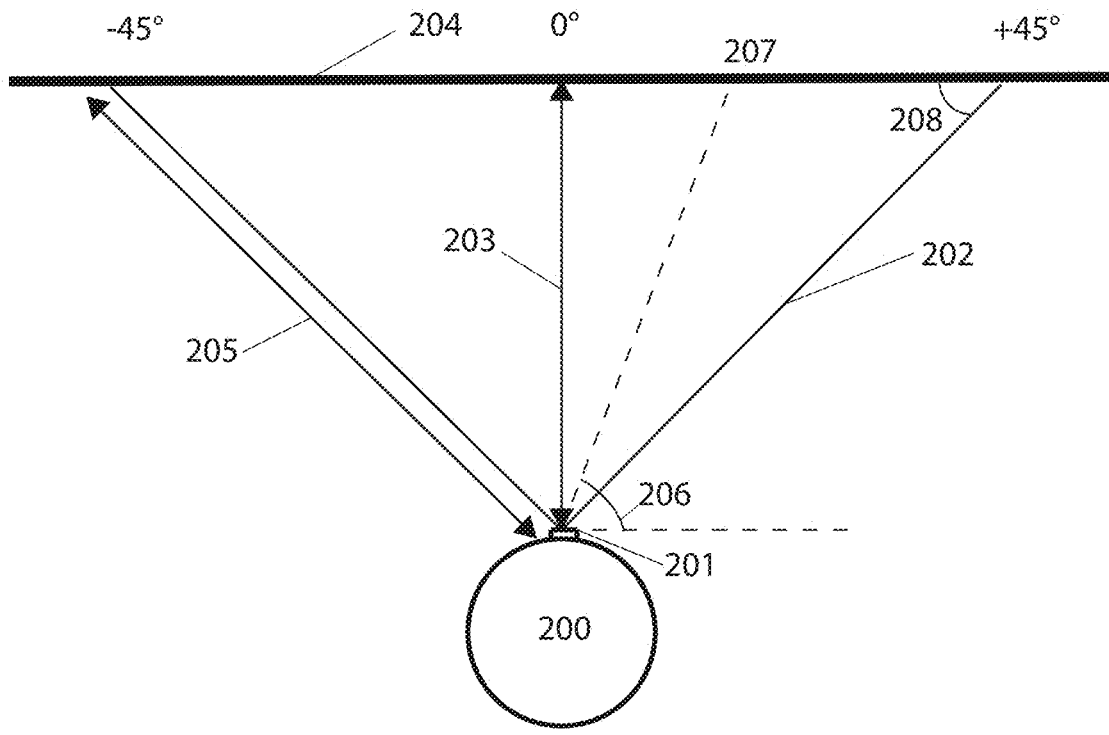
FIG. 2 illustrates a depth sensor of a robotic device measuring the distance to an object within an environment, as provided in some embodiments.

FIG. 2 illustrates robotic device 200 with depth sensor 201 with field of view 202 of 90°, the center of the field of view located at 0° and spanning to +45° and −45° on either side. Distance 203 to object 204 taken with field of view 202 measured at angle 0° is the minimum distance $d_{min}$ of all readings taken within field of view 202, while distance 205 measured at angles +/−45° are the maximum distance $d_{max}$. Given $d_{min}$, the distance r(n) corresponding to a point n on an object at any angular resolution $\theta(n)$ is calculated by the processor:

$$r(n) = \frac{d_{min}}{\sin(-\theta(n))}$$

This is shown in FIG. 2 wherein angle 206 of point 207 on object 204 corresponds to $\theta(n)$ of point n in the equation above. The horizon a of the depth sensor is also computed by the processor given $d_{min}$ and $d_{max}$. This is shown in FIG. 2 as angle 208:

$$\alpha = asn\frac{d_{min}}{d_{max}}$$

A combined error e of the range and light intensity output by the depth sensor is used by the control system to identify deviation from the line model and hence detect an opening in the wall.

$$e = \sum \left(I(n)r(n)^4 - a\right)^2 + \left(r(n) - \left(\frac{d_{min}}{\sin(-\theta(n))}\right)\right)^2$$

The error e is minimal for walls and significantly higher for an opening in the wall, as the data will significantly deviate from the line model. A threshold is used by the processor to determine whether the data points considered indicate an opening in the wall when, for example, the error exceeds some threshold value.

Figure 3:
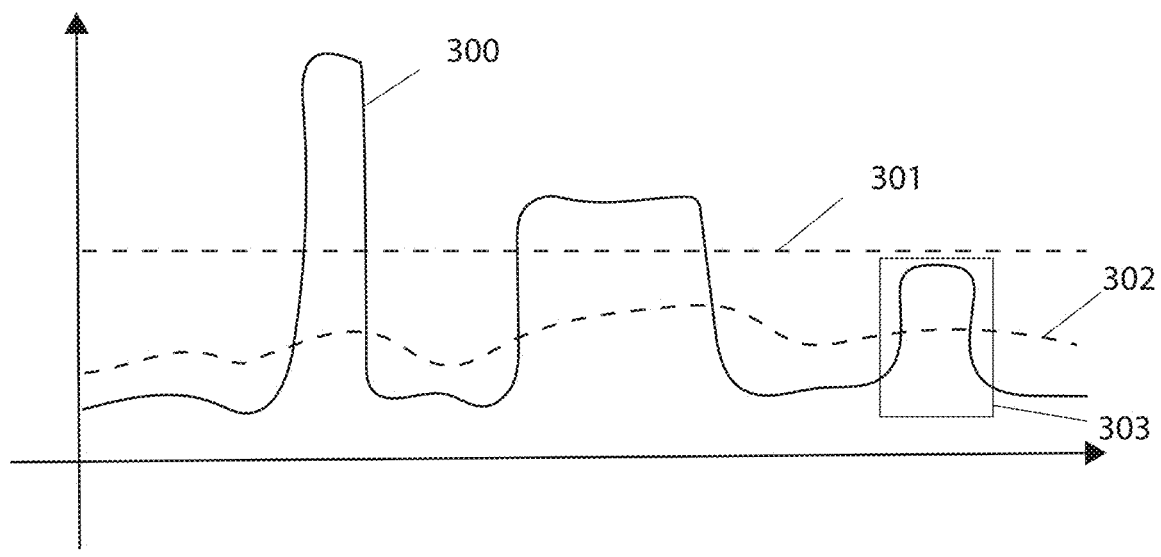
FIG. 3 illustrates an example of an adaptive threshold a processor of a robotic device uses in detecting an opening in a wall in some embodiments.

In some embodiments, the processor uses an adaptive threshold wherein the values below the threshold may be considered to be a wall. An adaptive threshold across the data is determined by the processor of the robotic device by averaging a number of local measurements. For example, threshold value $x_i$ is determined by the processor as the average of the local data measurements spanning from $x_i+1$ to $x_i+L$, wherein L determines the number of local data measurements considered in calculating threshold value $x_i$. In some embodiments, order statistics is also used by the processor to determine adaptive threshold values. FIG. 3 illustrates range data 300 and fixed threshold 301 as well as adaptive threshold 302. Adaptive threshold 302 is adjusted based on range data in the local region of interest. In certain cases, wherein a fixed threshold value is used, certain regions may be incorrectly identified as a wall, such as region 303.

In some embodiments, the processor does not consider openings with width below a specified threshold as an opening in the wall, such as openings with a width too small to be considered a door or too small for the robotic device to fit through. The processor of the robotic device estimates the width of the opening in the wall by identifying angles $\varphi$ with a valid range value and with intensity greater than or equal to $$\frac{a}{d_{max}}.$$

The difference between the smallest and largest angle among all $\varphi$ angles provide an estimate of the width of the opening:

$$\varphi = \left\{\theta(n) \vee (\{r(n) \neq \infty\}) \wedge \left(I(n) \geq \left(\frac{a}{d_{max}}\right)^4\right)\right\}$$

The width of an opening in the wall may also be determined by the control system by identifying the angle at which the measured range noticeably increases and the angle at which the measured range noticeably decreases and taking the difference between the two angles.

Similar to the line model method described above, in some embodiments a wall or opening in the wall is detected by the processor using recursive line fitting of the data. The processor of the robotic device compares the error $(y-(ax+b))^2$ of data points $n_1$ to $n_2$ to a threshold $T_1$ and summates the number of errors below the threshold. The processor then computes the difference between the number of points considered $(n_2-n_1)$ and the number of data points with errors below threshold $T_1$. If the difference is below a threshold $T_2$ then the processor assigns the data points to be a wall otherwise assigns the data points to be an opening in the wall.

$$\left((n_2 - n_1) - \sum_{n_1}^{n_2}(y - (ax + b))^2 < T_1\right) < T_2$$

Figure 4:
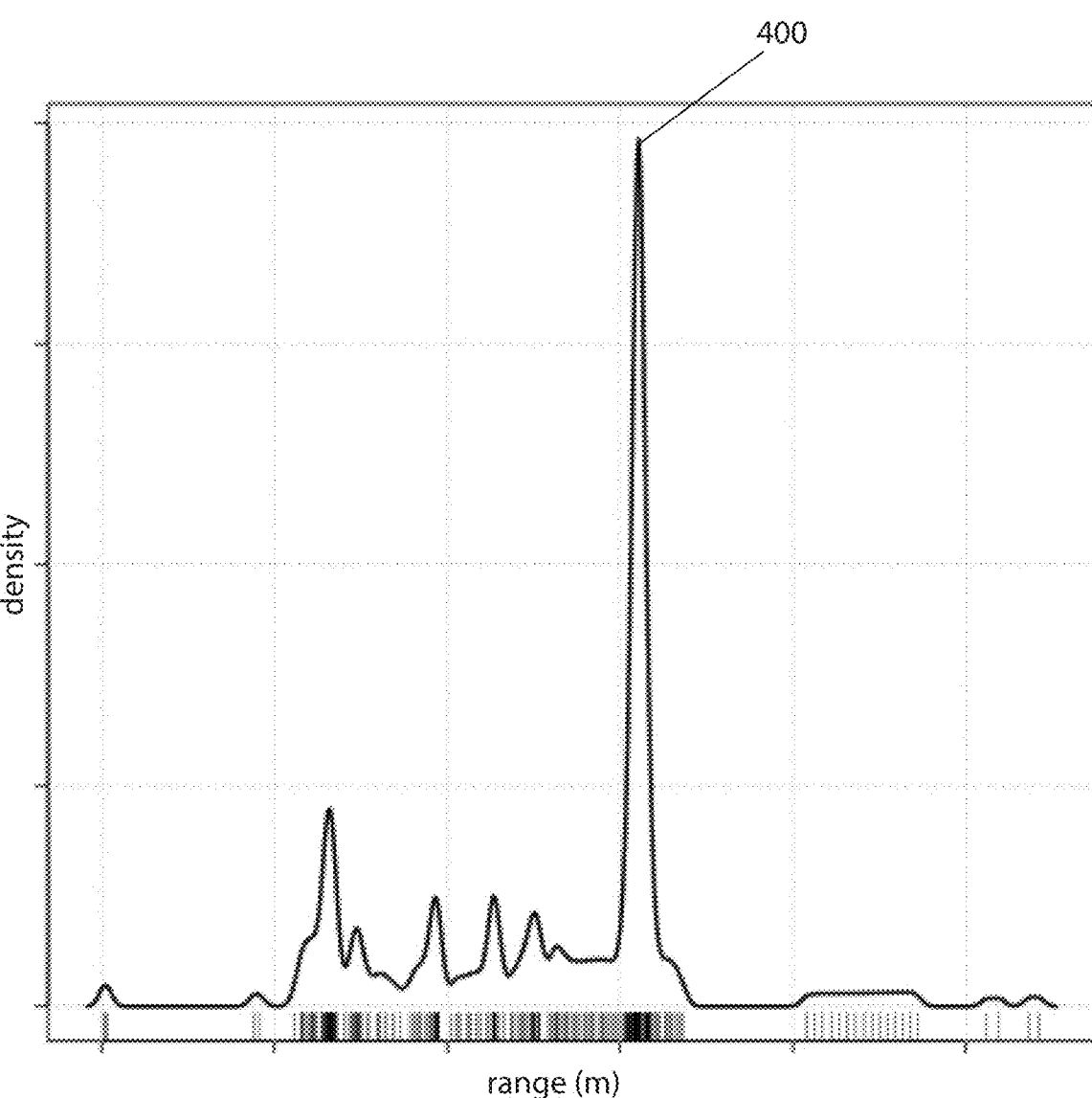
FIG. 4 illustrates an example of a probability density of an x-coordinate reading taken by a sensor of the robotic device in some embodiments.

In another embodiment, the processor uses entropy to predict an opening in the wall, as an opening in the wall results in disordered measurement data and hence larger entropy value. When the entropy surpasses a certain threshold, it can be assumed to be an opening in the wall. Entropy of the measurement data is determined by the processor using:

$$H(X) = -\sum_{i=1}^{n} P(x_i)\log P(x_i)$$

where $X=(x_1, x_2, \ldots, x_n)$ is a collection of possible data measurements, such as depth measurements. $P(x_i)$ is the probability of a depth measurement having value $x_i$. $P(x_i)$ may be determined by, for example, counting the number of measurements within a specified area of interest with value $x_i$ and dividing that number by the total number of measurements within the area considered. In some embodiments, the processor compares entropy of measurement data to entropy of measurement data of a wall. For example, the entropy may be computed for the probability density function (PDF) of the data to predict if there is an opening in the wall in the region of interest. In the case of a wall, the PDF may show localization of readings around wall coordinates, thereby increasing certainty and reducing entropy. For example, FIG. 4 illustrates PDF of x-coordinate reading, wherein localization is shown as the peak in probability density 400, indicating high certainty of a wall and hence lower entropy. In some embodiments, a region of interest is identified as an opening in the wall by the processor when the entropy surpasses a specified threshold. During measurement, the depth sensor may encounter three types of barriers, namely, an object, a wall, or the maximum depth senor range. In most cases, objects are concentrated around the wall of the environment and, hence, the probability of finding an object near a wall is higher. Each depth reading has a value with some probability. In any given row of the 2D x-y data the processor of the robotic device takes the average of the y-component as the PDF estimate for the x-component:

$$P(x) = \int P(x, \gamma) d\gamma \cong \int \frac{1}{N} dy = \frac{1}{N} \sum y$$

In embodiments, a probabilistic method is applied by pre-training the processor of the robotic device with a classifier to provide a priori prediction. In embodiments, a supervised machine learning algorithm is used by the processor to identify features of openings and walls. A training set of, for example, depth data is used by the processor to teach the classifier common features or patterns in the data corresponding with openings and walls such that the processor can identify walls and openings in walls with some probability distribution. In this way, a priori prediction from a classifier combined with real-time measurement is used together to provide a more accurate prediction of a wall or opening in the wall. In some embodiments, Bayes Theorem is used by the processor to provide probability of an opening in the wall given that the robot is located near an opening in the wall:

$$P(A \mid B) = \frac{P(B \mid A) P(A)}{P(B)}$$

P(A\B) is the probability of an opening in the wall given that the robot is located close to an opening in the wall, P(A) is the probability of an opening in the wall, P(B) is the probability of the robot being located close to an opening in the wall, and P(B\A) is the probability of the robot being located close to an opening in the wall given that an opening in the wall is detected.

Figure 5:
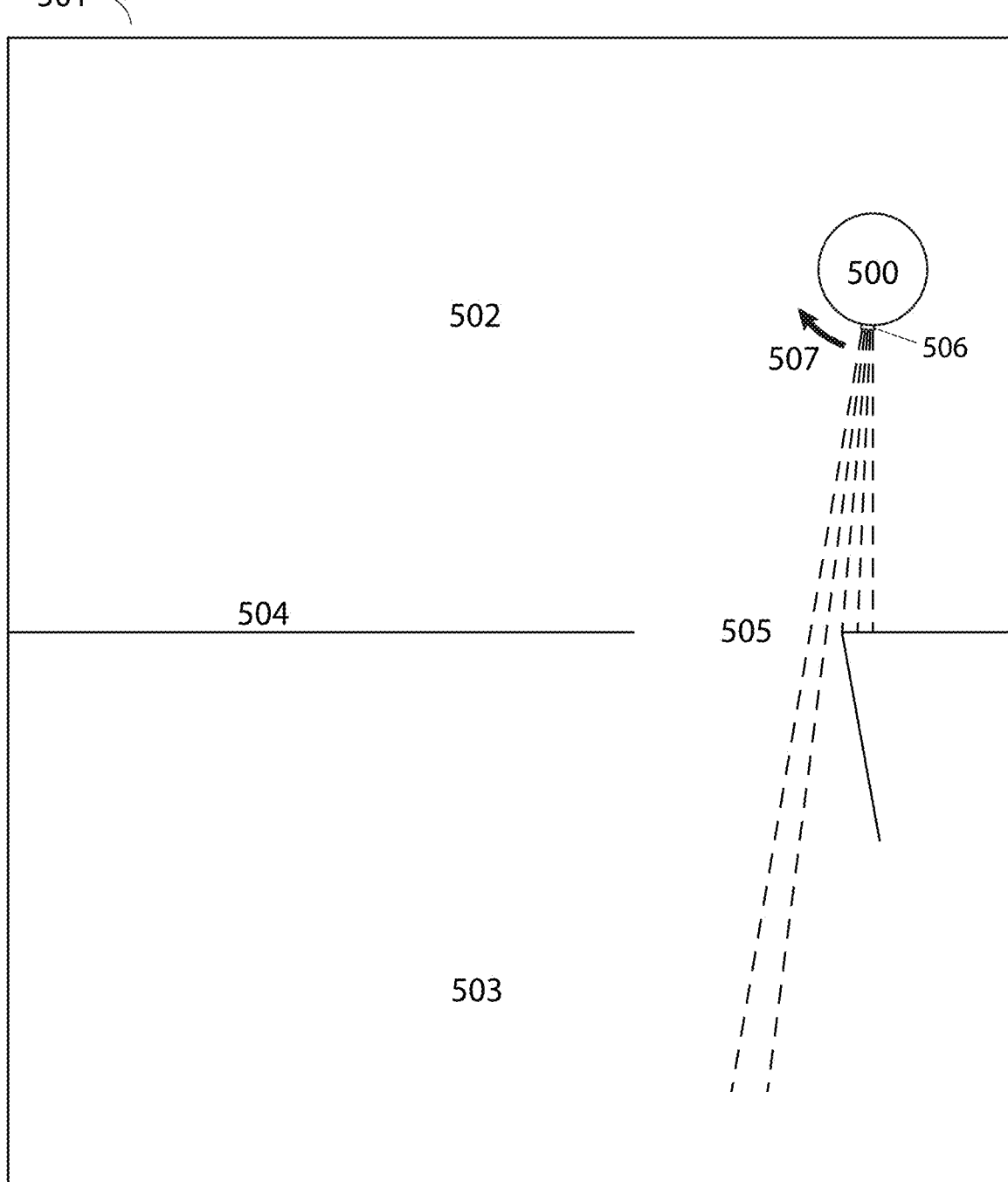
FIG. 5 illustrates a depth sensor of a robotic device measuring a boundary and an opening in the wall of an environment in some embodiments.

The different methods described for detecting an opening in the wall above may be combined in some embodiments and used independently in others. Examples of methods for detecting a doorway are described in, for example, U.S. Patent Applications 62/613,005, 62/616,928, and Ser. No. 15/615,284, the entire contents of which are hereby incorporated by reference. In some cases, the steps described for identifying a doorway are executed after identifying an opening in the wall. Different types of depth measurement devices may be used that are capable of measuring depth or data from which depth may be inferred, such as LIDAR, LADAR, depth sensor, TOF sensor, stereo vision and other distance or depth measuring devices. In some embodiments, more than one measurement device may be used simultaneously. In some embodiments, the processor of the robotic device may mark the location of doorways within a map of the environment. For example, FIG. 5 illustrates robotic device 500 within workspace 501 with two subareas 502 and room 503 divided by wall 504 and connected by door 505. Depth sensor 506 measures the range to objects within the environment, such as wall 504. The range data is fitted to a line model by the processor of the robotic device. The data which fit the line model are assigned as a wall by the processor while range data that deviates from the line model by some error threshold are assigned as a door. As robotic device 500 rotates in direction 507, part of the ranges measured within the field of view of depth sensor 506 correspond with wall 504 as well as door 505. The ranges corresponding with door 505 will be significantly greater than those measured for adjacent wall 504 and, hence, will deviate from the line model. This sudden deviation can be identified by any of the methods described above for detecting an opening in a wall. In some embodiments, the robotic device may be configured to avoid crossing the identified doorway for a predetermined amount of time or until the robotic device has encountered the doorway a predetermined number of times. In some embodiments, the robotic device may be configured to drive through the identified doorway into a second subarea for cleaning before driving through the doorway in the opposite direction. In embodiments, the robotic device may be configured to execute any number of actions upon identification of a doorway and different actions may be executed for different doorways. In some embodiments, the processor uses doorways to segment the environment into subareas. In some embodiments, the processor represents subareas using a stack structure, for example, for backtracking purposes wherein the path of the robotic device back to its starting position can be found using the stack structure.

To find an optimal location to move to, such that the robotic device is able to best discover the opening in the wall and beyond, lines normal to a frontier of the area to be discovered are determined. From the normal lines a series of ray tracing may then be used to find a location suitable for the robotic device to move to by first defining an area through which the rays pass. One or more processors of the robotic device may mark the defined area in a map, for example, or record coordinates corresponding to the defined area. The defined area may also be recorded in any other form. To ensure the robotic device is not too close to the frontier, in some embodiments, the defined area may be trimmed such that areas close to the frontier are eliminated. The centroid of the defined area is then used as the location the robotic device moves to. In other embodiments, other locations within the defined area may be used. In some cases, the identified gap is simply a depression and the steps described for identifying a doorway are not required.

Due to noise in measurement and movement, in some embodiments, there are accumulating inaccuracies in the boundaries discovered as the robotic device moves from one room to another. As the number of rooms increases the inaccuracies may accumulate further. For example, due to movement noise, a robotic device intending to move directly forward into a second room from a first adjacent room may in reality have moved to a location further away. This movement noise results in the boundaries of the second room misaligning with the boundaries of the first room. In some embodiments, a room graph is created where each room is defined separately in order to avoid or minimize such issues. The room graph may be a mathematical graph that has nodes representing the rooms and vectors determining how the rooms are connected to one another. In some embodiments, each room has its own properties associated with it such as a centroid, a first set of perimeter points corresponding to an initial scan of the room, a completed set of perimeter points where all perimeters and doors are captured, a last set of perimeter points corresponding to the last scan of the room, a set of doors with an associated field of view, doors labelled with the room to which they lead to, a unique number and/or label to identify the room and flags signifying visitations to the room. For example, the doorways in each boundary may be identified to have a path to adjacent rooms such that the robotic device may return back to the first room after covering multiple rooms. For example, a wall and doorway shared between two rooms are found in both the boundaries of the first room and the second room. The doorway in the boundary of the first room is identified to have a path to the second room and the doorway in the boundary of the second room is identified to have a path to the first room.

In some embodiments, the processor of the robotic device applies a room planner to keep track of the paths executed through the rooms and the rooms visited and to suggest one or more paths for the robotic device to follow. For example, if there are two doors in a room, the room planner can suggest which door to go through. In embodiments, the room planner can also suggest alternative paths if a particular room is not accessible when, for example, a previously identified door is closed or blocked. In embodiments, the room planner has different modes, such as exploration mode wherein the robotic device is configured to explore undiscovered areas or return to start mode wherein the robotic device is configured to return to its initial starting point in the working environment. In embodiments, the room planner chooses the current perimeter view of each room and switches between different perimeter views of a room as each room can have multiple different sets of perimeters. For example, when the robotic device first enters a room, the room planner of the robotic device determines that the partial perimeter initially observed by a depth sensor of the robotic device best matches with data of a perimeter view of the previous room and initially uses that perimeter as the view of the robotic device. However, as the depth sensor of the robotic device observes more areas within the room, the room planner finds that a perimeter view of the current room better matches the observations and switches the view of the robotic device. In embodiments, the room planner chooses which perimeter view of a room to use based on a specific task of the robotic device. For example, if the robotic device is exiting a second room to enter a first room, the room planner finds it beneficial to load only the inside perimeter of the first room rather than all sets of perimeters of the first room. In embodiments, the room planner can apply MDP in a similar manner as described above for determining, for example, the optimal order in which different rooms are covered or the optimal coverage path. For example, the first time (or first few times) the room planner advises the next room to be visited on a pseudo random basis and monitors the performance. Then every time it experiments with the order of rooms, it monitors how the performance changes using a cost function that is penalized with movement of the robot odometer. The goal is for the room planner to minimize the cost function over time and, once the algorithm converges, it is likely to provide the best possible order for visiting the rooms. In embodiments, the cost function can include other or additional penalizing factors, such as repeat coverage or distance travelled from on subarea to another. For example, a robotic device can travel through rooms A, B, C, and D in the stated order to reach room D, meanwhile room D may have a direct connection to room A. Over time the system may converge such that the robotic device is configured to travel directly to room D from room A rather than travelling through rooms B and C first to get to room D. In some embodiments, to avoid falling into a local minima, optimization is controlled by the processor of the robotic device to achieve a balance between exploration and exploitation. The processor of the robotic device controls the amount of time spent on exploration versus exploitation. In embodiments, the room planner is a component of the processor of the robotic device or is an external component coupled to the processor of the robotic device or may be included in an application of a mobile device and may be implemented in software, hardware, or both.

The robotic device may use the plotted boundary to autonomously navigate the environment during operation, e.g., a cleaning or other work session. In some embodiments, the plotted (e.g., mapped, e.g., in vector or bitmap form)

boundary is stored in memory for future use. Storage of the plotted boundary may be in temporary memory such that a plotted boundary is only available during an operational session or in more permanent forms of memory such that the plotted boundary is available at the next session or startup. In some embodiments, the plotted boundary is further processed to identify rooms and other segments. In some embodiments, a new plotted boundary is constructed at each use. In some embodiments, the plotted boundary may be externally stored on another device such as the docking station or other base station of a robotic device or in the cloud (e.g., in memory of a server at a remote data center) or other remote storage device.

Figures 6A, 6B:
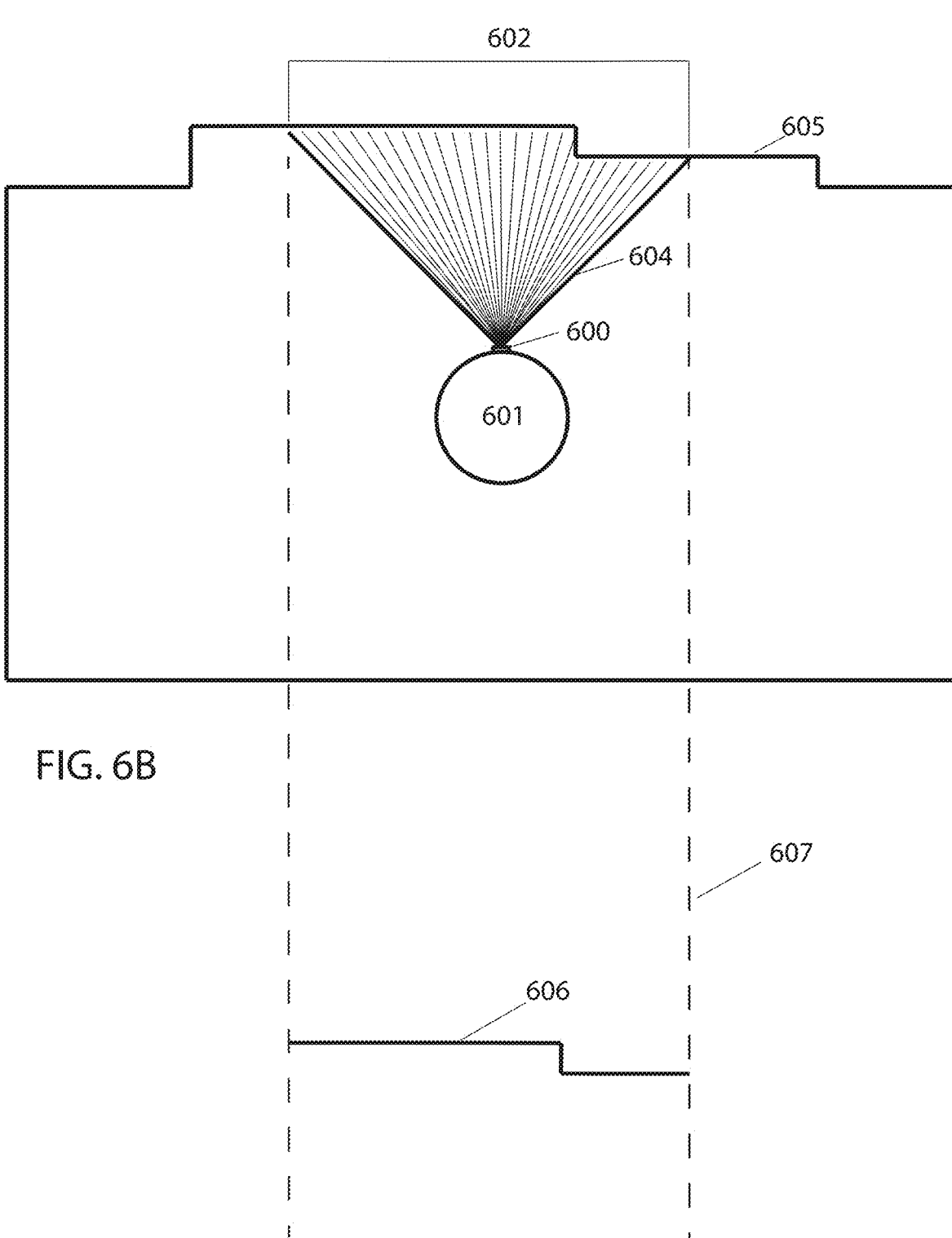
FIGS. 6A-6B illustrate a camera taking distance measurements of an enclosure within a first range of sight and resulting segment of a 2D boundary of the enclosure in some embodiments.

The techniques described above apply to some embodiments of the depicted approach. For example, FIG. 6A illustrates an embodiment consistent with the above techniques wherein camera 600 mounted on robotic device 601 is measuring distances 602 within first field of view (i.e. range of sight) 604. Distance measurements 602 taken by camera 600 measure the distance from camera 600 to object 605, which in this case is a wall. Referring to FIG. 6B, 2D boundary segment 606 resulting from plotted distance measurements 602 taken within first field of view 604 is illustrated. Dashed lines 607 demonstrates that resulting 2D boundary segment 604 corresponds to distance measurements 602 taken within field of view 604. In some embodiments, 3D distance measurements are taken and plotted to construct 3D boundary segment of the enclosure.

Figures 7A, 7B:
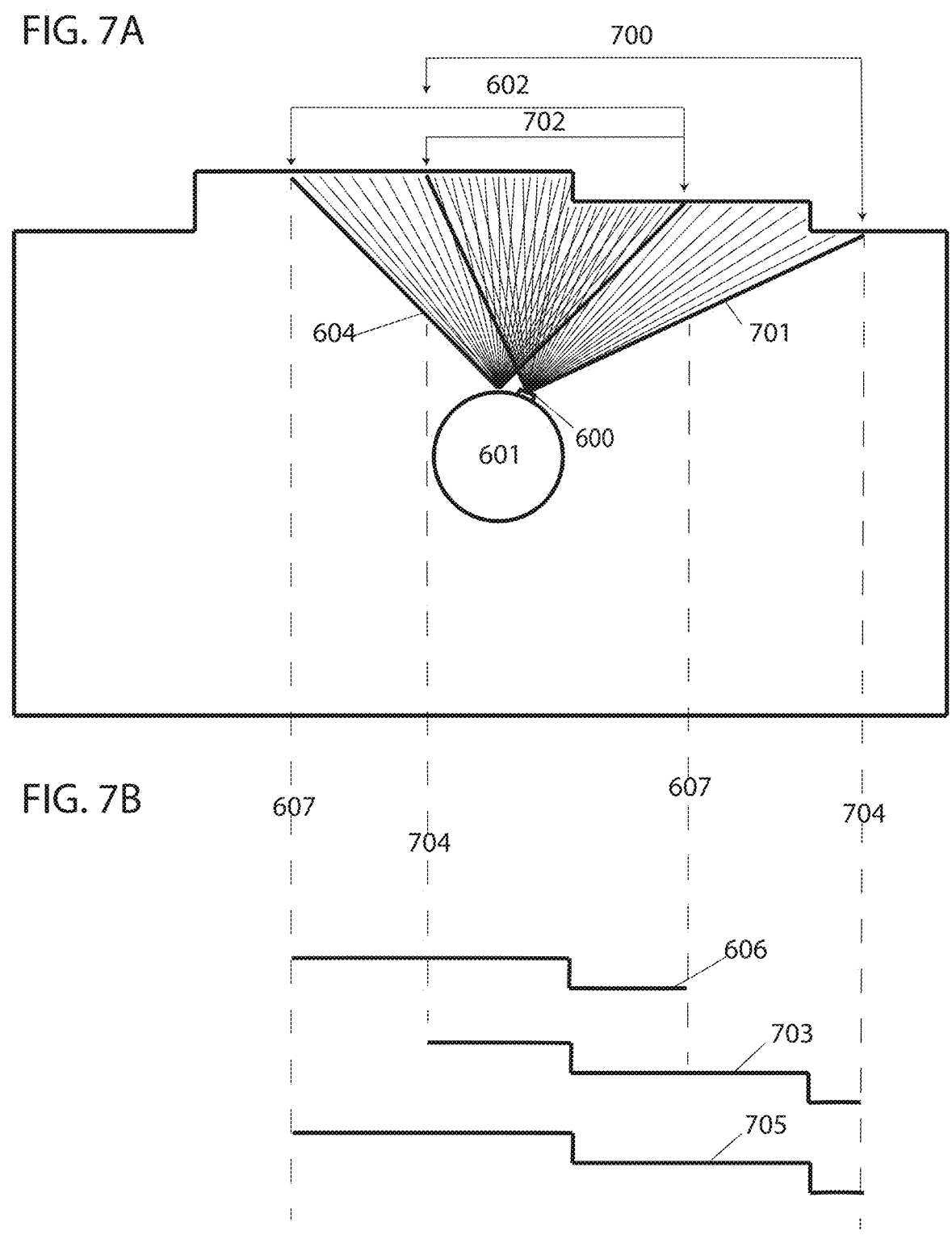
FIGS. 7A-7B illustrate how a segment of a 2D boundary of an enclosure is constructed from distance measurements taken within successively overlapping range of sight in some embodiments.

Referring to FIG. 7A, camera 600 mounted on robotic device 601 measuring distances 700 within second field of view 701 partly overlapping distance measurements 602 within first field of view 604 is illustrated. After distance measurements 602 within first field of view 604 are taken, robotic device 601 with mounted camera 600 moves to observe overlapping second field of view 701 and take distance measurements 700. As robotic device 601 moves to observe second field of view 701, the values of distance measurements 602 taken within first field of view 604 are adjusted to account for the movement of robotic device 601. Distance measurements 702 represent the area of overlap between distance measurements 602 taken within field of view 604 and distance measurements 700 taken within field of view 701.

Referring to FIG. 7B, 2D boundary segments 606 and 703 resulting from distance measurements 602 and 700, respectively, are illustrated. While shown aligned, the processor may receive the data in a format in which each segment is in a distinct coordinate system, e.g., each in pixel coordinates of a different image. Segments 606 and 703 are bounded by dashed lines 607 and 704, respectively. 2D boundary segment 705 constructed from the combination of 2D boundary segments 606 and 703 and bounded by the outermost dashed lines of 607 and 704 is also illustrated. Distance measurements 700 captured within second field of view 701 are compared to distance measurements 602 captured within first field of view 604 to identify the area of overlap bounded by the innermost dashed lines of 704 and 607. The processor of the robotic device may compare measurements and determine the area of overlap using different methods. In some embodiments, an area of overlap may be identified in response to detecting an iteration of comparison in which a number of consecutive distance values measured from the first field of view and second field of view are equal or close in value. Although the values of overlapping distance measurements from the first and second fields of view may not be exactly the same, distances with similar values, to within a tolerance range of one another, can be identified (e.g., determined to correspond based on similarity of the values). For example, the processor may compute a root mean square (RMS) delta of values between consecutive fields of view at a spatial offset. The spatial offset is incremented until a first derivative of the RMS delta crosses zero or a global minimum is found. Furthermore, identifying matching patterns in the value of distances measured within the first and second fields of view can also be used in identifying the area of overlap. For example, a sudden increase then decrease in the distance values observed in both sets of measurements may be used to identify the area of overlap. Examples include applying an edge detection algorithm (like Haar or Canny) to the fields of view and aligning edges in the resulting transformed outputs. Other patterns, such as increasing values followed by constant values or constant values followed by decreasing values or any other pattern in the values of the measured distances, can also be used to estimate the area of overlap. A Jacobian and Hessian matrix can be used to identify such similarities. In some embodiments, thresholding may be used in identifying the area of overlap wherein areas or objects of interest within an image may be identified using thresholding as different areas or objects have different ranges of pixel intensity. For example, an object captured in an image, the object having high range of intensity, can be separated from a background having low range of intensity by thresholding wherein all pixel intensities below a certain threshold are discarded or segmented, leaving only the pixels of interest. In some embodiments, a metric can be used to indicate how good of an overlap there is between the two sets of perceived depths, such as the Szymkiewicz-Simpson coefficient. Or some embodiments may determine an overlap with a convolution. Some embodiments may implement a kernel function that determines an aggregate measure of differences (e.g., a RMS value) between some or all of a collection of adjacent distance readings in one image relative to a portion of the other image to which the kernel function is applied. Some embodiments may then determine the convolution of this kernel function over the other image, e.g., in some cases, with a stride of greater than one pixel value. Some embodiments may then select a minimum value of the convolution as an area of identified overlap that aligns the portion of the image from which the kernel function was formed with the image to which the convolution was applied. Areas of overlap may also be identified in response to other detected comparisons. For example, the one or more processors of the robotic device may use pixel patterns and/or features and/or patterns of columns, rows, and/or curves with high brightness (to which ares or lines may be fitted) to determine overlapping points of similarities between two different images).

In some embodiments, the measured movement of robotic device 601 over one time step, as it moves from observing first field of view 604 to observing second field of view 701, is used to estimate the area of overlap between distance measurements 602 and 700 and is used to verify the identified area of overlap. In some embodiments, the area of overlap identified using the methods described above is verified if the identified overlap is within a threshold angular distance of the overlap estimated using measured movement. In some embodiments, the processor uses the measured movement to choose a starting point for the comparison between measurements from the first field of view and measurements from the second field of view. For example, the processor uses the measured movement to choose a starting point for the comparison between measurements from the first field of view and measurements from the second field of view. The processor iterates using a method such as that described above to determine the area of overlap. The processor verifies the area of overlap if it is within a threshold angular distance of the overlap estimated using measured movement.

In some embodiments, measured movement of robotic device 601 may be used as the primary method of determining the area of overlap. Movement measuring devices such as odometer, gyroscope, structure from motion, and optical flow sensor may be used to measure movement of robotic device 601. In some embodiments, the processor stores the movement data in a movement vector and transforms all distance measurements to correspond to, for example, an initial coordinate system of a first field of view observed by the camera coinciding with a stationary coordinate system. For example, in an embodiment where C is a stationary Cartesian coordinate system, C0 may be the observed coordinate system of a first field of view of a camera fixed to a robotic device at time to with state S and coinciding with stationary coordinate system C. The robotic device with attached camera displaces and the camera observes coordinate system C1 of a second field of view of the camera at time t1 with state S'. A movement measuring device measures the movement vector V with values (x, y, theta) as the robotic device moves from observing a first field of view to a second field of view. The processor uses the movement vector V to transform distances observed in coordinate system C1 of the second field of view to corresponding distances in coordinate system C0 of the first field of view, coinciding with static coordinate system C. The movement vector V allows all measurements corresponding to different coordinate systems of different fields of view observed to be transformed to a single coordinate system, such as the static coordinate system C, thereby allowing the entire boundary to correspond to a single coordinate system. Further detail of this method are provided in a U.S. Patent Application titled METHODS FOR FINDING THE PERIMETER OF A PLACE USING OBSERVED COORDINATES, filed on the same day as this application by the same applicant, the entirety of which is hereby incorporated by reference.

2D boundary segment 606 from plotted distance measurements taken within first field of view 604 and 2D boundary segment 703 from plotted distance measurements taken within second field of view 701 may be combined at the area of overlap to construct larger 2D boundary segment 705. When the values of overlapping distance measurements from range of sight 604 and 701 within the area of overlap are slightly different, an analytical method, such as a data or sensor fusion algorithm, averaging, minimum sum of errors, or any other suitable method is used to calculate a single distance value for each pair of overlapping distance measurements that can result in a more accurate ground truth as compared to the distance measurements initially taken. In some embodiments, the processor of the robotic device may select an analytical method, such data or sensor fusion algorithms, minimum mean square error or sum of squared residuals minimization or any other method to merge multiple data sets together. Further, the one or more processors of the robotic device may additionally use other mathematical processing to improve accuracy of the data in order to achieve better alignment between successive sets of overlapping distance measurements.

In some embodiments, this method is repeated such that distance measurements captured within successively overlapping range of sights can be combined to construct the plotted boundary of the entire enclosure.

Figure 8:
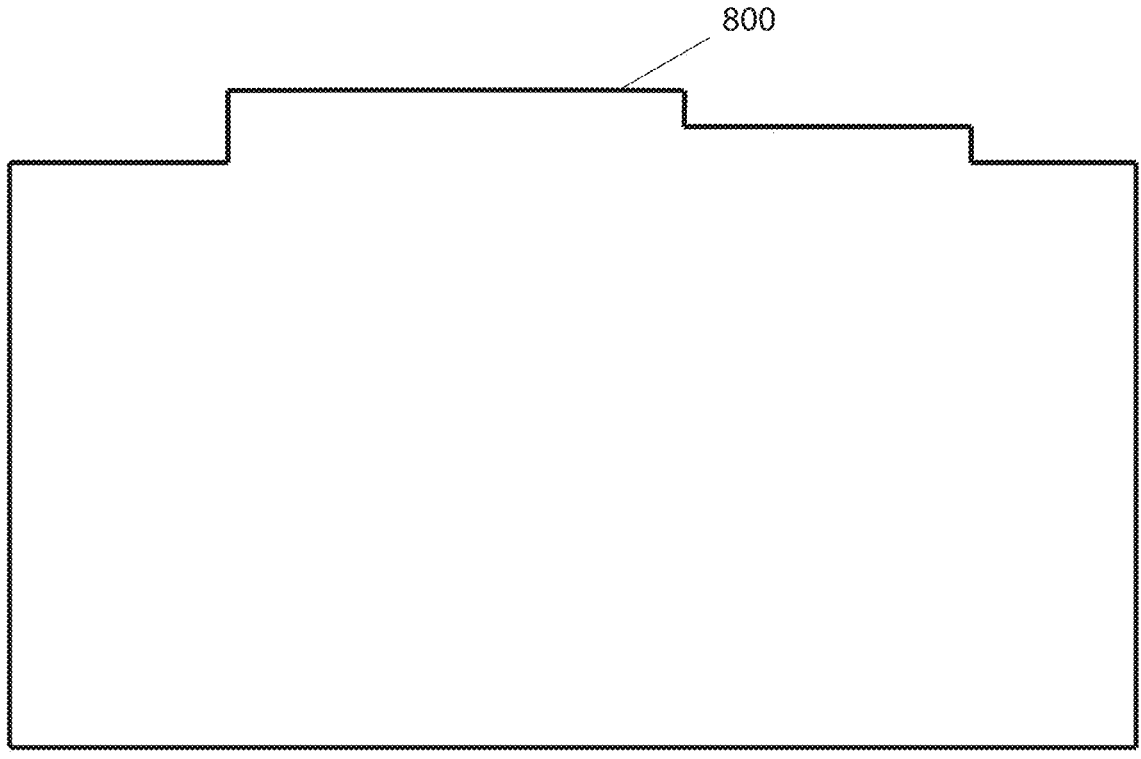
FIG. 8 illustrates a complete 2D boundary of an enclosure constructed from distance measurements taken within successively overlapping range of sight in some embodiments.

FIG. 8 illustrates data produced by an embodiment where complete closed loop 2D boundary 800 is constructed from plotted distance measurements taken within successively overlapping range of sights. 2D boundary 800 can, for example, be used by robotic device 601 with mounted camera 600 to autonomously navigate within the enclosure during operation. Some embodiments may determine a coverage path based on the area bounded by boundary 800.

Figure 9A:
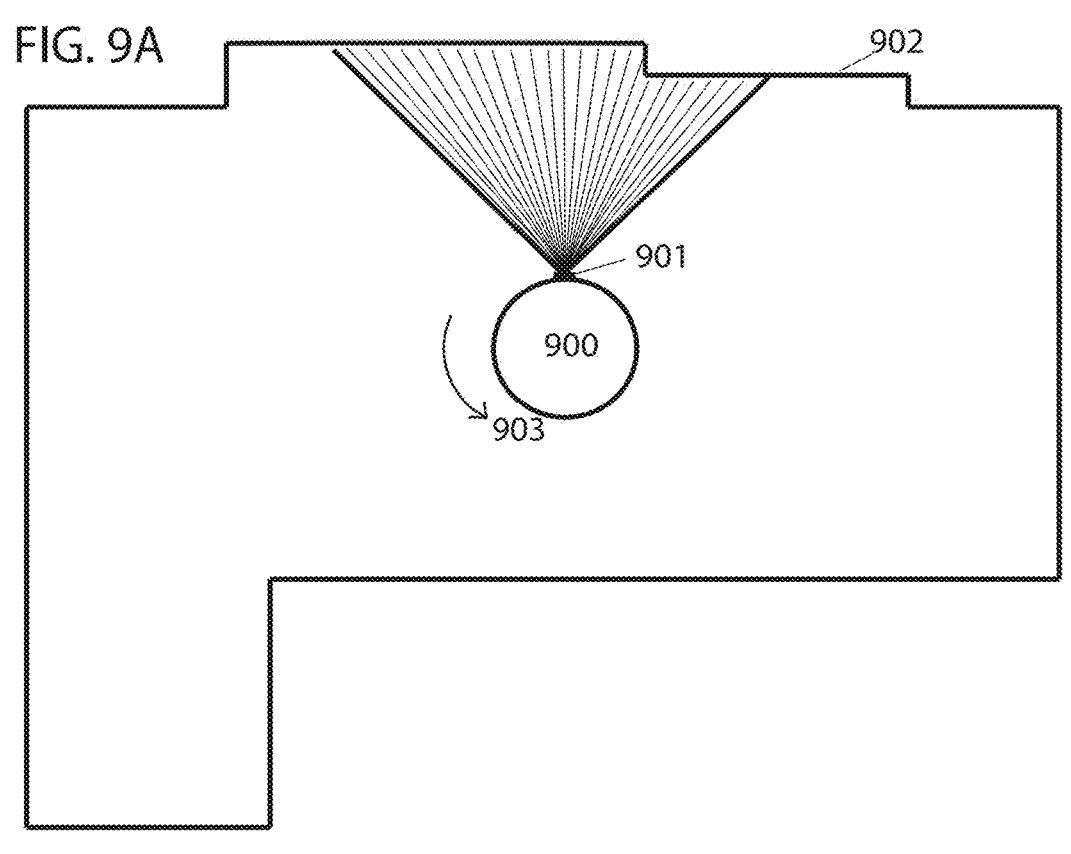
FIGS. 9A-9D illustrate construction of an incomplete 2D boundary of an enclosure and the method for completing the incomplete 2D boundary of the enclosure in some embodiments.
Figure 9B:
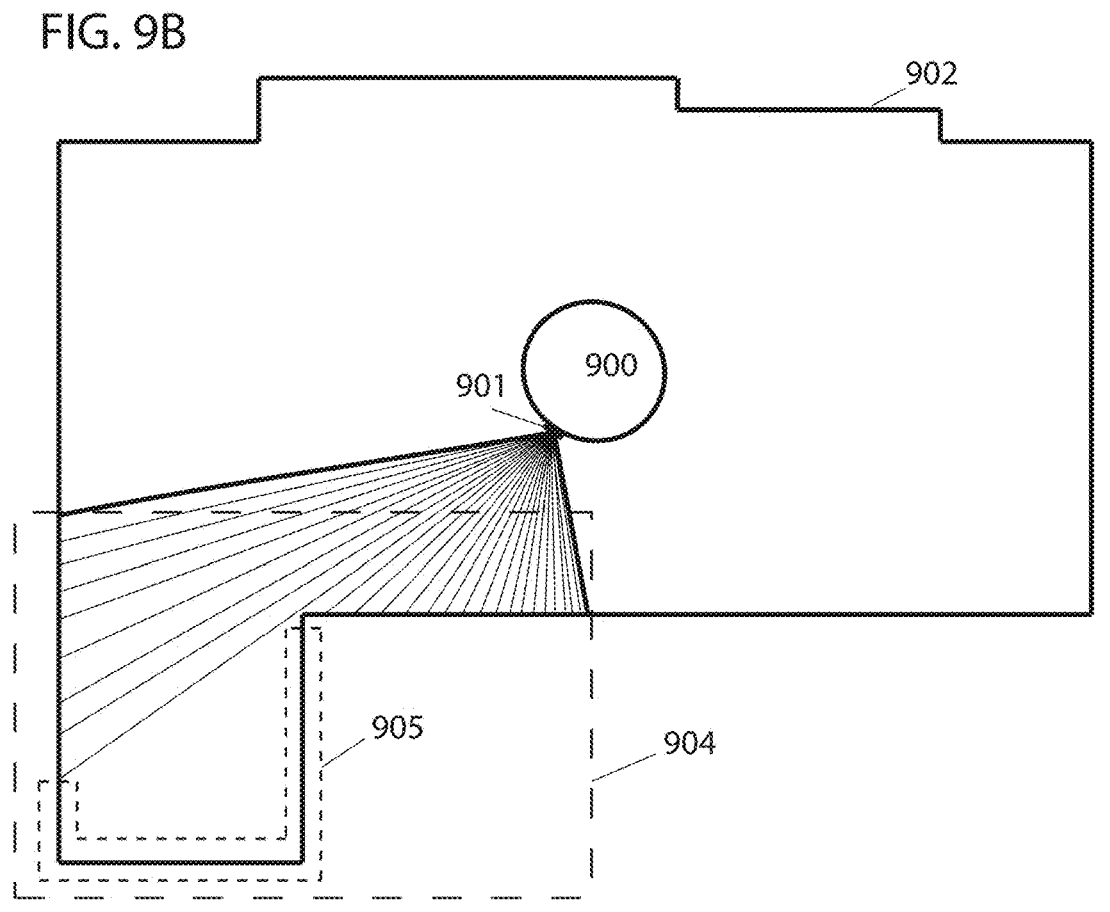

In some instances, the plotted boundary of the enclosure is incomplete where gaps are observed within the plotted boundary due to lack of distance measurements. The lack of distance measurements may be due to, for example, an opening in the wall, blind spots unseen by the measuring device or a lack of data resulting from a measuring device with inadequate detection range. FIG. 9A illustrates robotic device 900 with mounted camera 901 rotating in direction 903 while taking distance measurements within field of view 904. In this example, robotic device 900 is attempting to plot a 2D boundary from distance measurements taken within successively overlapping range of sights by rotating camera 901 by 360 degrees. At this first-time point, camera 901 is able to detect wall 902 within field of view 904 of camera 901. FIG. 9B illustrates robotic device 900 with mounted camera 901 taking distance measurements within field of view 906 at a second-time point. Although the position of robotic device 900 is approximately at the center of enclosure 907, camera 901 cannot detect wall 902 in area 905 within field of view 906 due to the shape of enclosure 907.

Figure 9C:
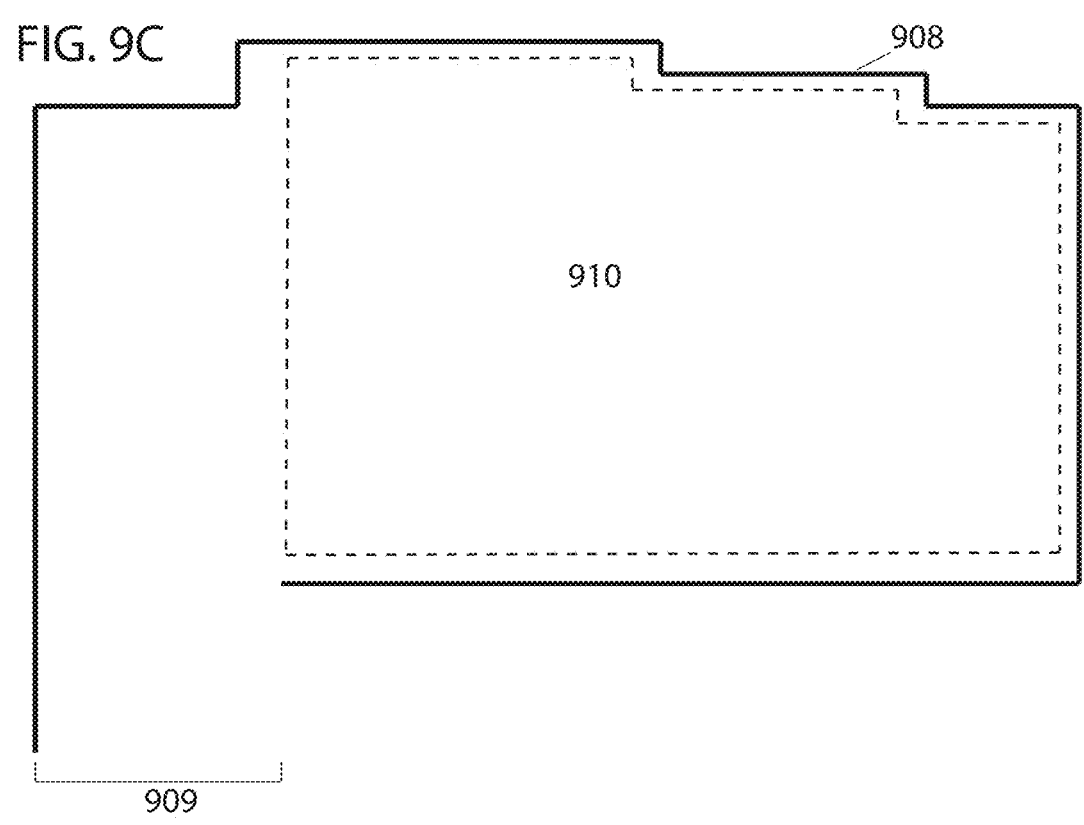

FIG. 9C illustrates resulting incomplete plotted boundary 908 of enclosure 907. Plotted boundary 908 is incomplete as distances were not measured for a section of enclosure 907 due to a blind spot unseen by camera 901, resulting in undiscovered area 909 within which a gap exists. Despite the gap, incomplete plotted boundary 908 is used by robotic device 900 to perform work in discovered area 910 of enclosure 907 as described above. As robotic device 900 covers area 910 it marks (e.g., in memory, on a map) covered areas within plotted boundary 908 to avoid repeat coverage. While performing work in discovered area 910, robotic device 900 continues to take distance measurements and merge them with existing plotted boundary 908 to close any gaps which may exist. In some embodiments, discovered area 910 is segmented into sections and robotic device 900 performs work in each section successively, beginning with sections closest to robotic device 900 and ending with the sections furthest away from robotic device 900. For illustrative purposes, assume after completing coverage in discovered area 910, undiscovered area 909 within which a gap located still exists. In some embodiments, robotic device 900 then travels towards undiscovered area 909 while taking distance measurements.

For example, some embodiments may form a double connected edge list (DCEL) and then select edges of the boundary having only one vertex in the list. Embodiments may then navigate the robot to an opposing vertex of the selected edges that is not part of the DCEL. Or some embodiments may cause the robot to traverse a path in an arc centered on such a point while facing the point.

Robotic device 900, in some embodiments, explores undiscovered area 909 wherein a gap is identified by taking distance measurements and combining them with previously measured overlapping distance measurements until the gap in undiscovered area 909 no longer exists. In some embodiments, robotic device 900 performs work in the new areas it discovers as it explores undiscovered area 909 wherein the gap is located. If robotic device 900 does perform work in newly discovered areas during exploration, in some embodiments, newly discovered areas are split into sections and robotic device 900 covers them one at a time.

Figure 9D:

In some embodiments, robotic device 900 explores undiscovered area 909 wherein the gap is located in plotted boundary 908 before performing work in discovered area 910. In any case, as robotic device 900 moves, it marks areas covered within plotted boundary 908 to avoid repeat coverage. In some embodiments, robotic device 900 uses marked areas within the plotted boundary of the enclosure to decide whether to cover marked areas again based on the path of the robotic device, the user settings, and/or its coverage algorithm. FIG. 9D illustrates complete closed loop boundary 911 of enclosure 907 after exploration of undiscovered area 909 is complete. In some embodiments, after exploring undiscovered areas within which identified gaps are located and covering all discovered areas within the plotted boundary, the robotic device moves along the plotted boundary while using sensory devices to verify that no additional gaps exist.

Figure 9E:
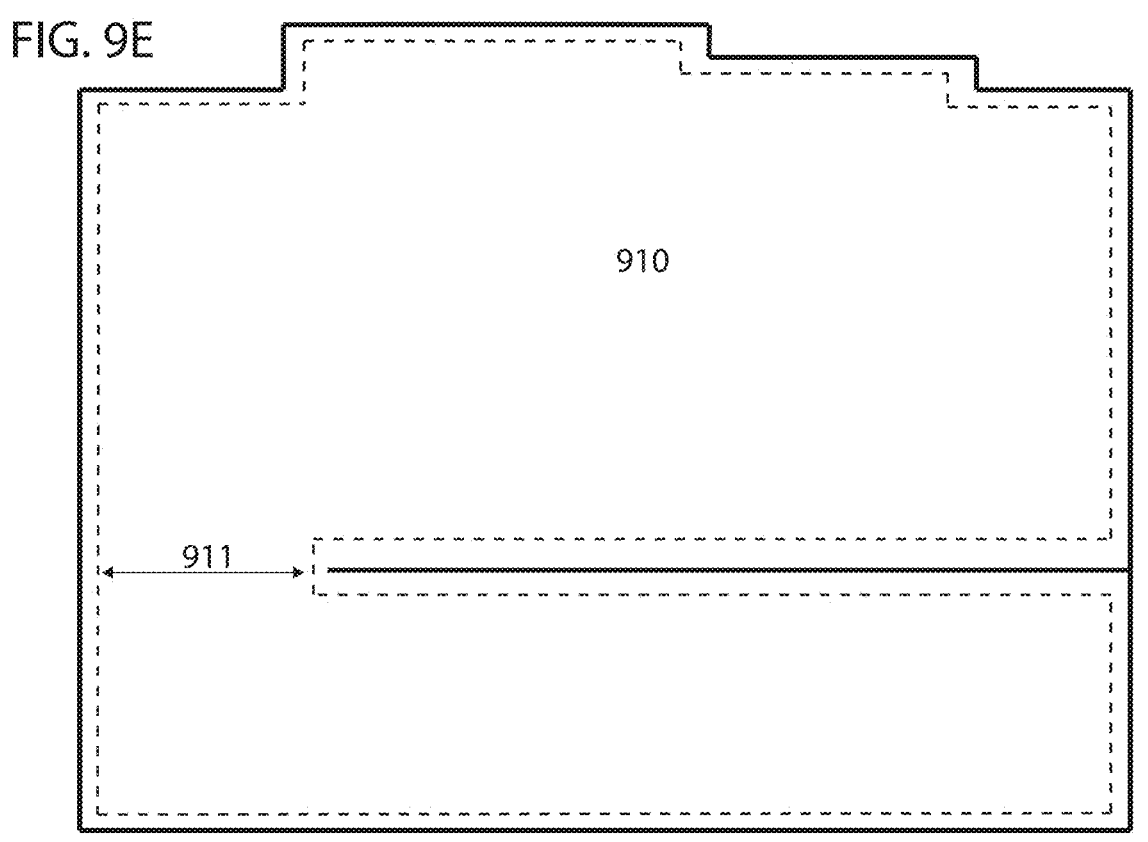
FIGS. 9E-9F illustrate how an opening in the wall is used to segment an area into subareas in some embodiments.
Figure 9F:
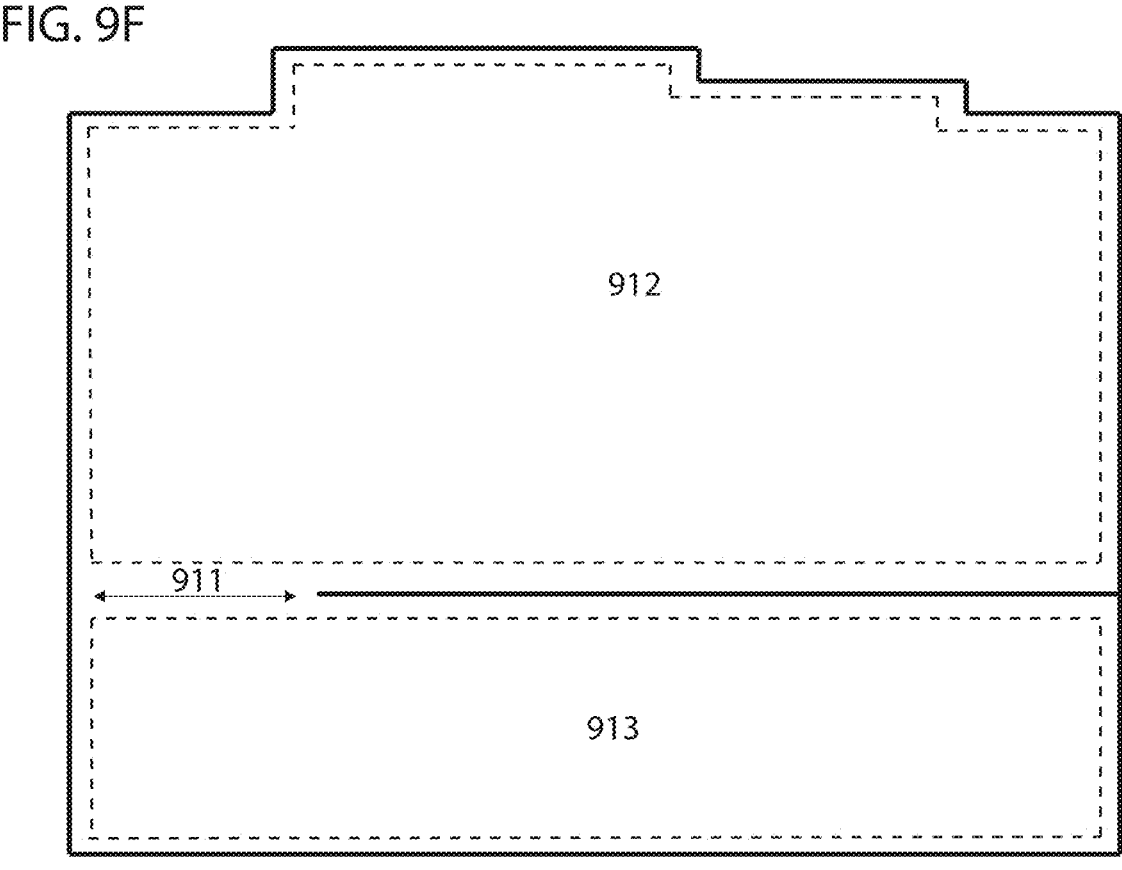

FIG. 9E illustrates an embodiment wherein robotic device 900 discovers an extension to discovered area 910 upon exploring the undiscovered area within which a gap was located (FIG. 9D). The robot may determine, based on sensed data, that the initially observed gap in the plotted boundary was due to opening in the wall 911 separating two areas using the techniques discussed above. Opening in the wall 911 can be used to segment total area 910 outlined by dashed lines in FIG. 9E using the techniques discussed above, into smaller subareas 912 and 913 each separately outlined by dashed lines in FIG. 9F. Subareas 912 and 913 may be treated independently, wherein the robotic device can be programmed to operate and execute tasks within a particular subarea. For example, the robotic device may be programmed to execute a wall-follow coverage algorithm in subarea 912 and rectangular-spiral coverage algorithm in subarea 913, or to only clean subarea 913, or to clean subarea 912 and 913 on particular days and times. In some embodiments, unique tags, such as a number or any label, can be assigned to each subarea. In some embodiments, the user assigns unique tags to each subarea, and embodiments receive this input and associate the unique tag (such as a human-readable name of a room, like "kitchen") with the area in memory. Some embodiments may receive instructions that map tasks to areas by these unique tags, e.g., a user may input an instruction to the robot in the form of "vacuum kitchen," and the robot may respond by accessing the appropriate map in memory that is associated with this label to effectuate the command. In some embodiments, the robotic device assigns unique tags to each subarea. For example, 912 and 913 can be considered unique tags used to identify two separate subareas. The unique tags can be used to set and control the operation and execution of tasks within each subarea and to set the order of coverage of each subarea. For example, the robotic device can be programmed to cover subarea 912 first and subarea 913 last. In some embodiments, the order of coverage of the subareas is such that repeat coverage within the total area is minimized. In another embodiment, the order of coverage of the subareas is such that coverage time of the total area is minimized. The order of subareas can be changed depending on the task or desired outcome. The example provided only illustrates two subareas for simplicity but can be expanded to include multiple subareas, spaces, or environments, etc.

Figure 10A:
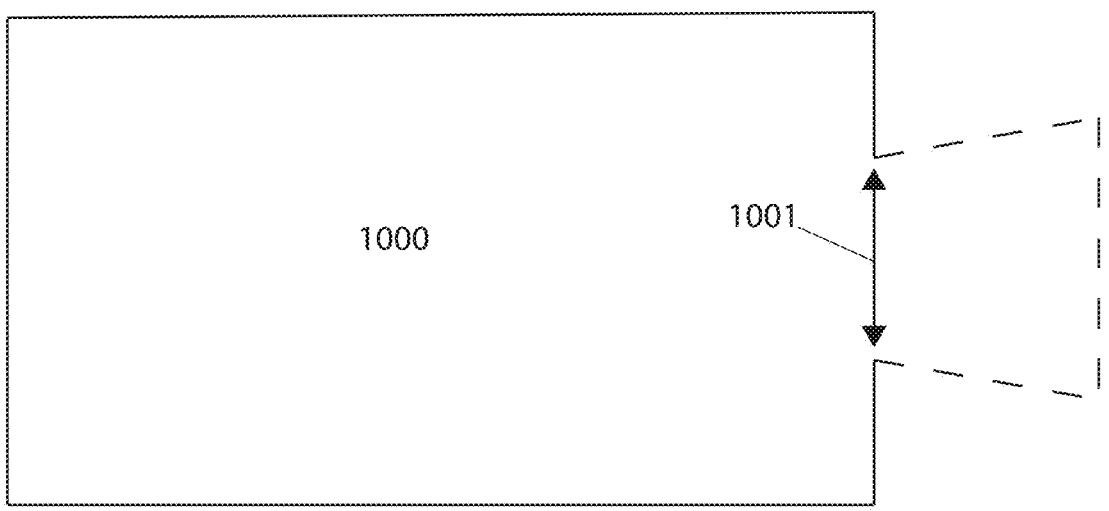
FIGS. 10A-10D illustrate a process of identifying an opening in a wall separating two rooms as a doorway in some embodiments.
Figure 10B:
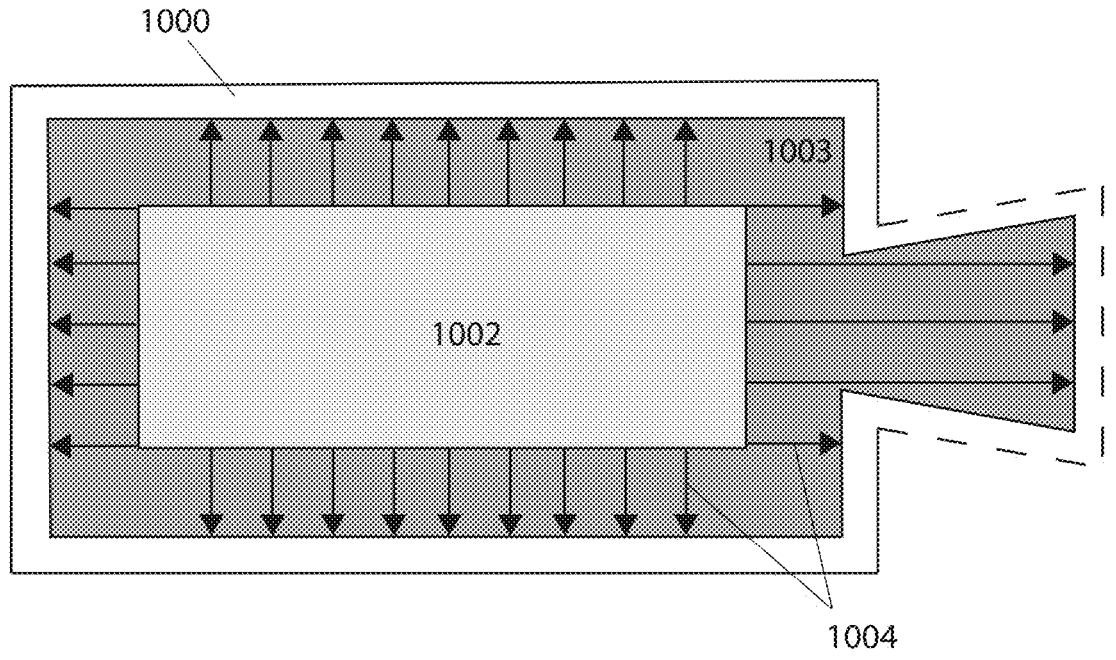
Figure 10C:
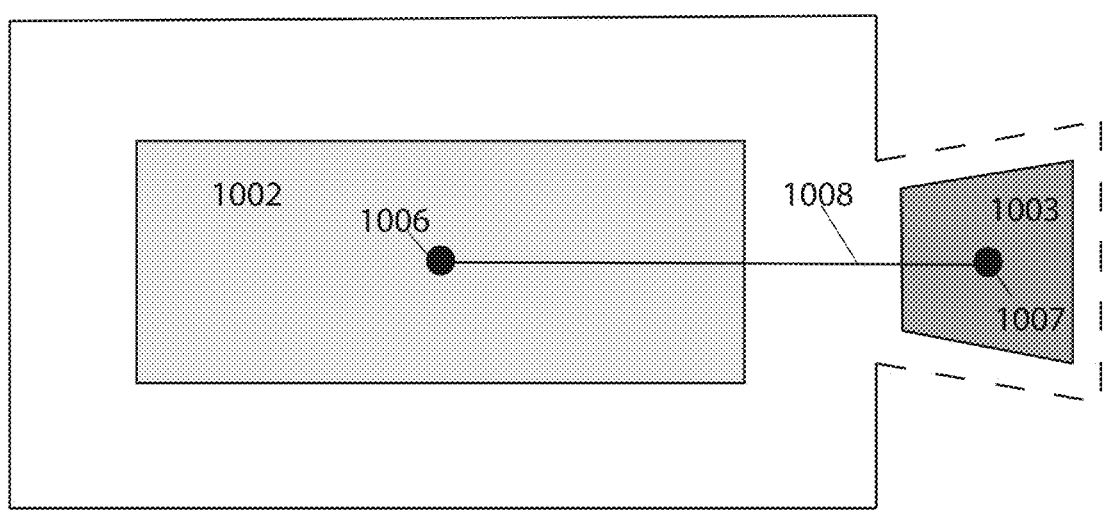
Figure 10D:
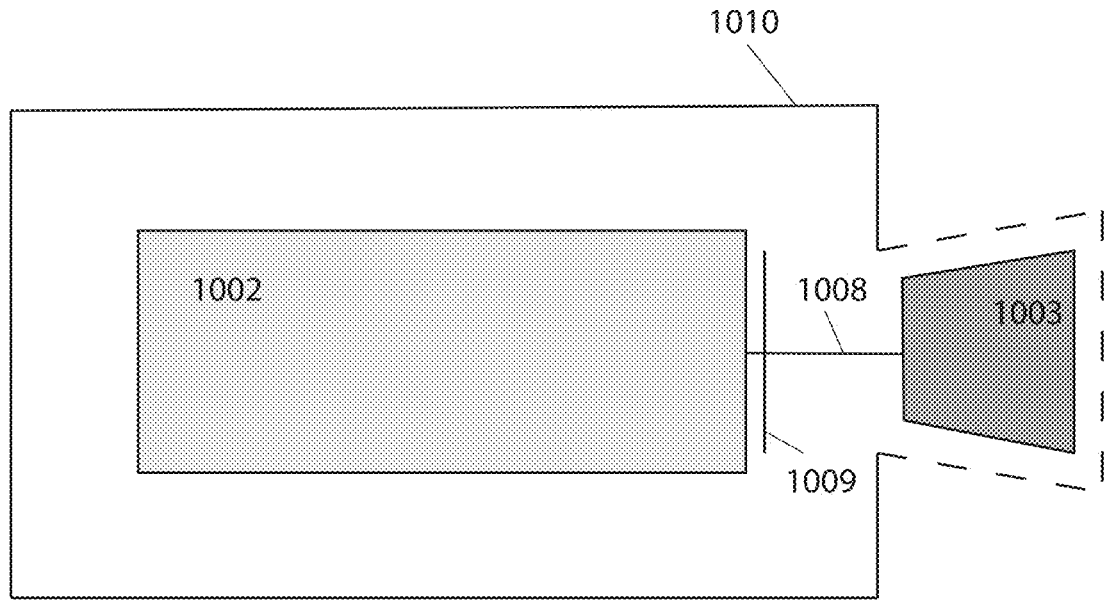

In some embodiments, an opening in the wall separating two rooms is identified as a doorway. For example, consider FIG. 10A, where first room 1000, opening in the wall 1001, and an area beyond 1001 are discovered. In some embodiments, to identify opening in the wall 1001 as a doorway, a robotic device may cover first internal space 1002 within first room 1000 but remain distanced from the boundaries detected as illustrated in FIG. 10B. The robotic device may then cover second internal space 1003 within the first room 1000, but this time reaches closer to the boundaries detected. One or more processors of the robotic device may record covered areas. For example, the one or more processors may mark areas covered within a map or record coordinates corresponding to areas covered. Other methods of recording areas covered may also be used. Distances 1004 between the outer edge of recorded first internal space 1002 covered and recorded second internal space 1003 covered, beyond first internal space 1002, are determined. Recorded areas from second internal space 1003 that are below threshold distance 1005 are discarded and remaining recorded area 1003, as shown in FIG. 10C, is referred to as an outside space. Centroids 1006 and 1007 of first internal space 1002 and outside space 1005, respectively, are determined and path line 1008 between centroids 1006 and 1007 is created. Path line 1008 passing through first internal space 1002 and outside space 1005 may be trimmed leaving only path line 1008 connecting the outer edge of first internal space 1002 to outer edge of outside space 1005 as shown in FIG. 10D. The one or more processors of the robotic device then mark opening in the wall 1001 as a doorway using an iterative process where theoretical doorway line 1009 perpendicular to path line 1008 connecting the outer edge of first internal space 1002 and the outer edge of outside space 1005 is fit to boundary 1010. At each iteration, doorway line 1009 moves further along path line 1008, beginning closer to first internal space 1002, until doorway line 1009 aligns with boundary 1010, at which point the one or more processors identify doorway line 1009 as a doorway and designated as such in memory.

Figure 10E:
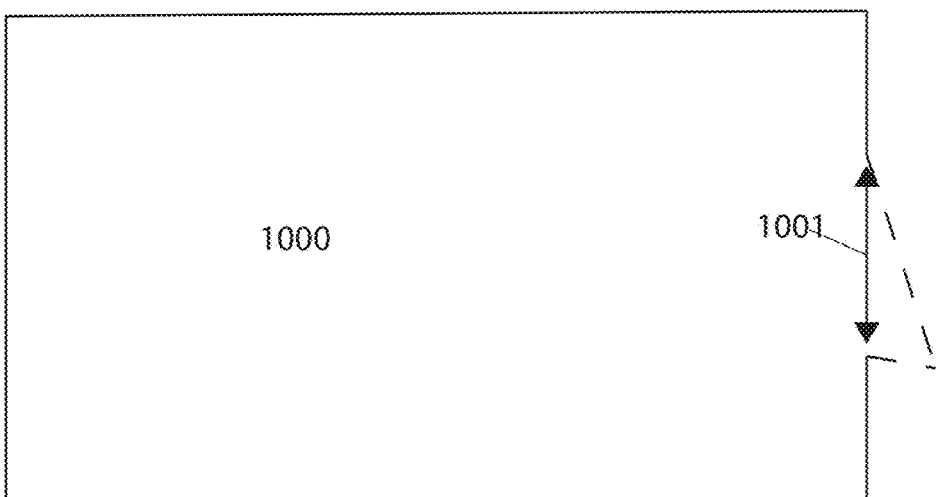
FIGS. 10E-10G illustrate the process of determining the location with best line of sight for discovering an opening in the wall and beyond in some embodiments.
Figure 10F:
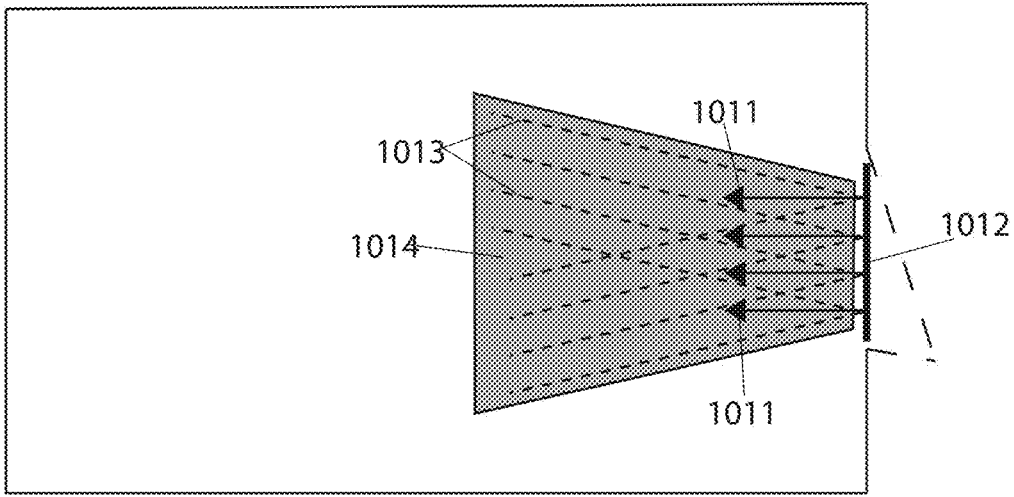
Figure 10G:
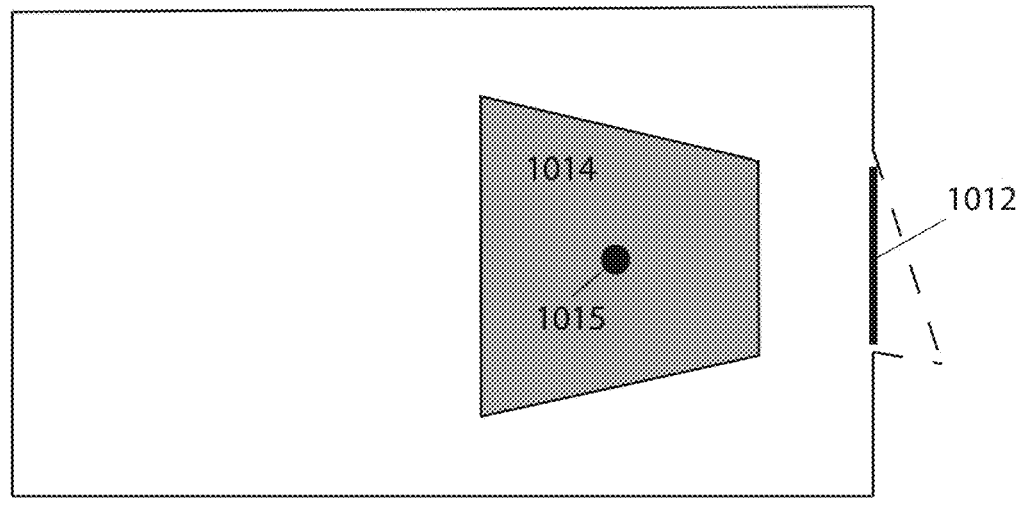

In some embodiments, as in the case shown in FIG. 10E, the line of sight of the robotic device is limited and only a small area beyond opening in the wall 1001 in room 1000 is discovered. In such cases, the robotic device moves closer to opening in the wall 1001 and scans to discover enough area beyond opening in the wall 1001 before initiating the steps described above for identifying a doorway. To find the optimal location to move to, such that the robotic device is able to best discover opening in the wall 1001 and beyond, lines 1011 normal to frontier 1012 of the area to be discovered are determined as illustrated in FIG. 10F. From normal lines 1011, a series of rays 1013 are used to find a location suitable for the robotic device to move to by first defining area 1014 through which rays 1013 pass. The defined area may, for example, be marked in a map or coordinates corresponding to the defined area may be recorded in memory. To ensure (or increase the likelihood that) the robotic device is not too close to frontier 1012, defined area 1014 is trimmed such that areas close to frontier 1012 are eliminated, as shown in FIG. 10G. Centroid 1015 of defined area 1014 may then be used as the location the robotic device moves to in order to discover opening in wall 1001 and beyond. In other embodiments, other locations within defined area 1014 may also be used. In some cases, the opening in the wall is simply a depression and the steps described for identifying a doorway are not required as described herein.

Figure 11:
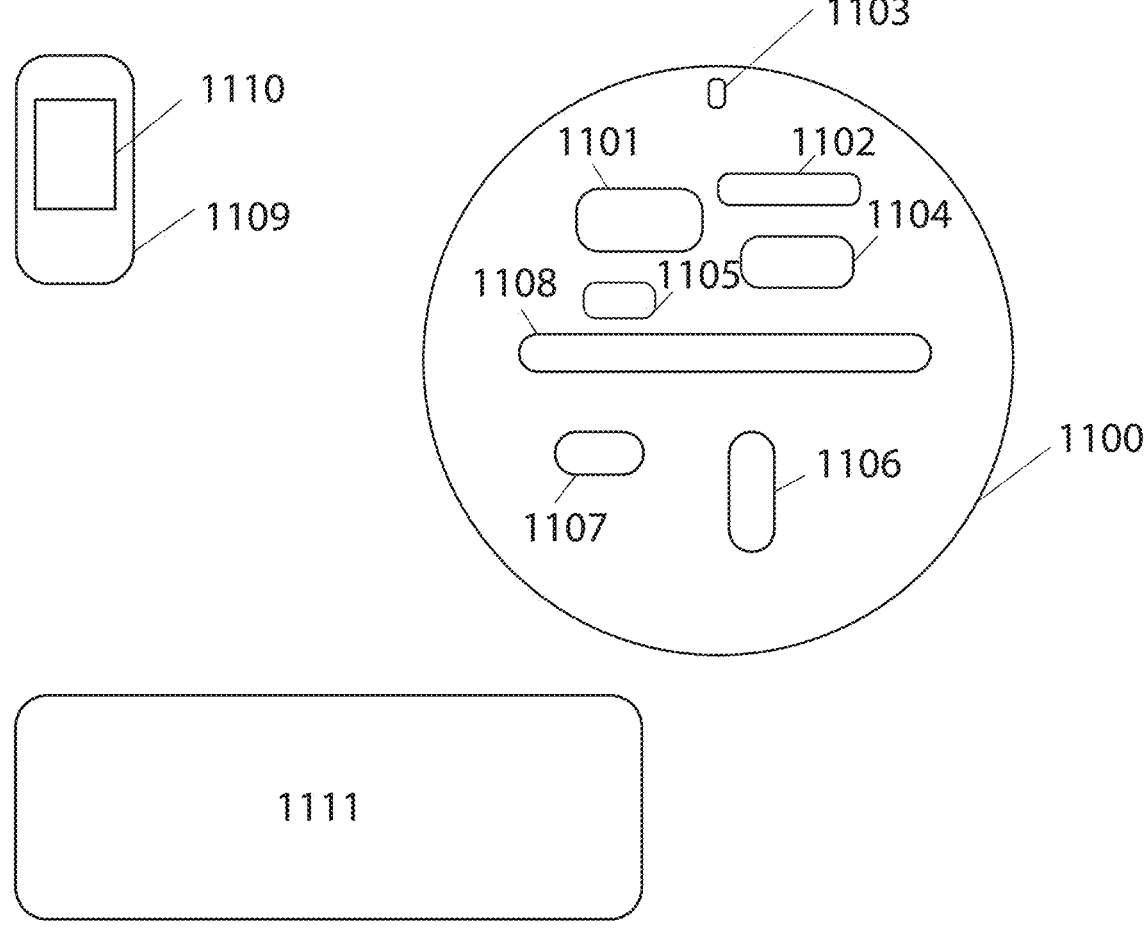
FIG. 11 is a schematic diagram of an example of a robot with which the present techniques may be implemented in some embodiments.

FIG. 11 depicts an example of a robotic device 1100 with processor 1101, memory 1102, a first set of sensors 1103, second set of sensors 1104, network communication 1105, movement driver 1106, timer 1107, and more or more cleaning tools 1108. The first and second set of sensors 1103 and 1104 may include depth measuring devices, movement measuring devices, and the like. In some embodiments, the robotic device may include the features of a robotic device described herein. The robot may have a variety of shapes, like circular, square, trapezoidal, etc., In some embodiments, program code stored in the memory 1102 and executed by the processor 1101 may effectuate the operations described herein. Some embodiments additionally include user device 1109 having a touchscreen 1110 with a software application coupled to the robotic device 1100. In some cases, the robot charges at a base station 1111, which in some cases, may include processors and memory by which some of the present functionality is implemented and which may wirelessly communicate with the robotic device 1100 in some cases where computations are offloaded in real time.

FIG. 12 illustrates a flowchart describing embodiments of a path planning method of a robotic device 1200, 1201, 1202, 1203, 1204, 1205 and 1206 corresponding with steps performed in some embodiments.

In some embodiments, a precision coefficient is calculated for each distance measurement. The value of the precision coefficient of a distance measurement is influenced by the value of the precision coefficient of distance measurements within its vicinity, the number of close-by distance measurements with high precision coefficient, the similarity between and the number of overlapping distance measurements recorded within separate range of sight. For example, if the values of overlapping distance measurements from two successive range of sights within the overlapping area are exactly the same, the value of the precision coefficient may have more positive change than if the values of overlapping distance measurements need a slight mathematical adjustment to be aligned together. In some embodiments, a tolerance range within which distance measurements are expected to fall within is established and the position of a distance measurement with respect to the tolerance range influences the value of its precision coefficient. In other embodiments, the value of the precision coefficient of distance measurements is influenced by the size of the overlapping area within which the distance measurement lies. For example, if the area of overlap between two successive range of sight is large, the value of precision coefficient of distance measurements within the area of overlap may be more positively influenced and may be a better estimate of the ground truth than if they lied within a smaller area of overlap.

In some embodiments, more than two sets of distance measurements may overlap. The combination of increased number of overlapping sets of distance measurements results in distance measurements with more accurate ground truth. In other embodiments, each distance measurement overlaps with at least one other distance measurement taken from another field of view (i.e. range of sight).

While the examples and illustrations provided apply the some of the present techniques to the construction of a 2D boundary using 2D distance measurements, the 2D boundary may be constructed using 3D distance measurements as well. Furthermore, embodiments may construct a 3D boundary of the enclosure using 3D distance measurements. The 3D boundary of the enclosure may be plotted using at least one camera, such as a distance measuring camera, capable of taking 3D distance measurements. 3D distance measurements taken within overlapping range of sights may be combined at identified areas of overlap where overlapping distance measurements are used as the attachment points. In some embodiments, a 2D boundary can be extracted from the plotted 3D boundary.

In some embodiments, the map is constructed in a coordinate system, where measured distances are expressed in coordinates and marked within the coordinate system. The coordinate system can be a Cartesian, polar, or homogenous coordinate system or any other coordinate system. In some embodiments, distances expressed in one type of coordinate system may be translated to another type of coordinate system. For example, distances expressed as Cartesian coordinates may be translated to polar, homogenous or any other type of coordinates or distances expressed as polar coordinates may be translated to Cartesian, homogenous or any other type of coordinates. Translated coordinates may be marked within a corresponding coordinate system to plot the boundary.

The resulting plot of the boundary may be encoded in various forms. For instance, some embodiments may construct a point cloud of three dimensional points by transforming vectors into a vector space with a shared origin, e.g., based on the above-described vectors, in some cases displacement vectors may be used and refined based on measured depths. Some embodiments may represent maps with a set of polygons that model detected surfaces, e.g., by calculating a convex hull over measured vectors within a threshold area, like a tiling polygon. Polygons are expected to afford faster interrogation of maps during navigation and consume less memory than point clouds at the expense of greater computational load when plotting.

Figure 13A:
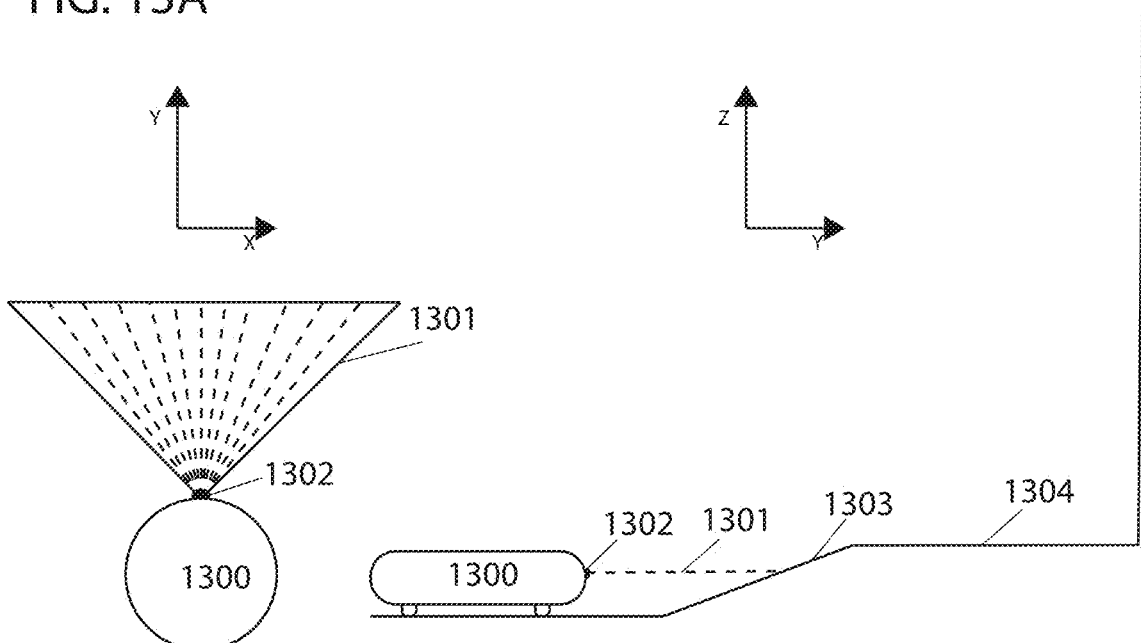
FIGS. 13A and 13B illustrate depth measurements taken in two dimensions and three dimensions, respectively, in some embodiments.
Figure 13B:
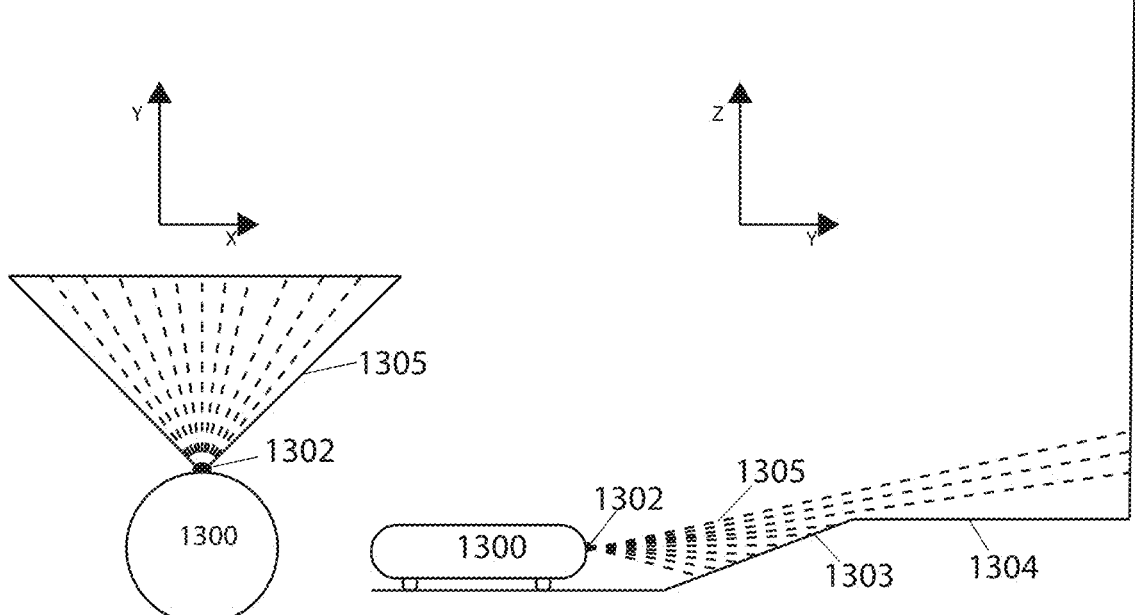
Figure 14:
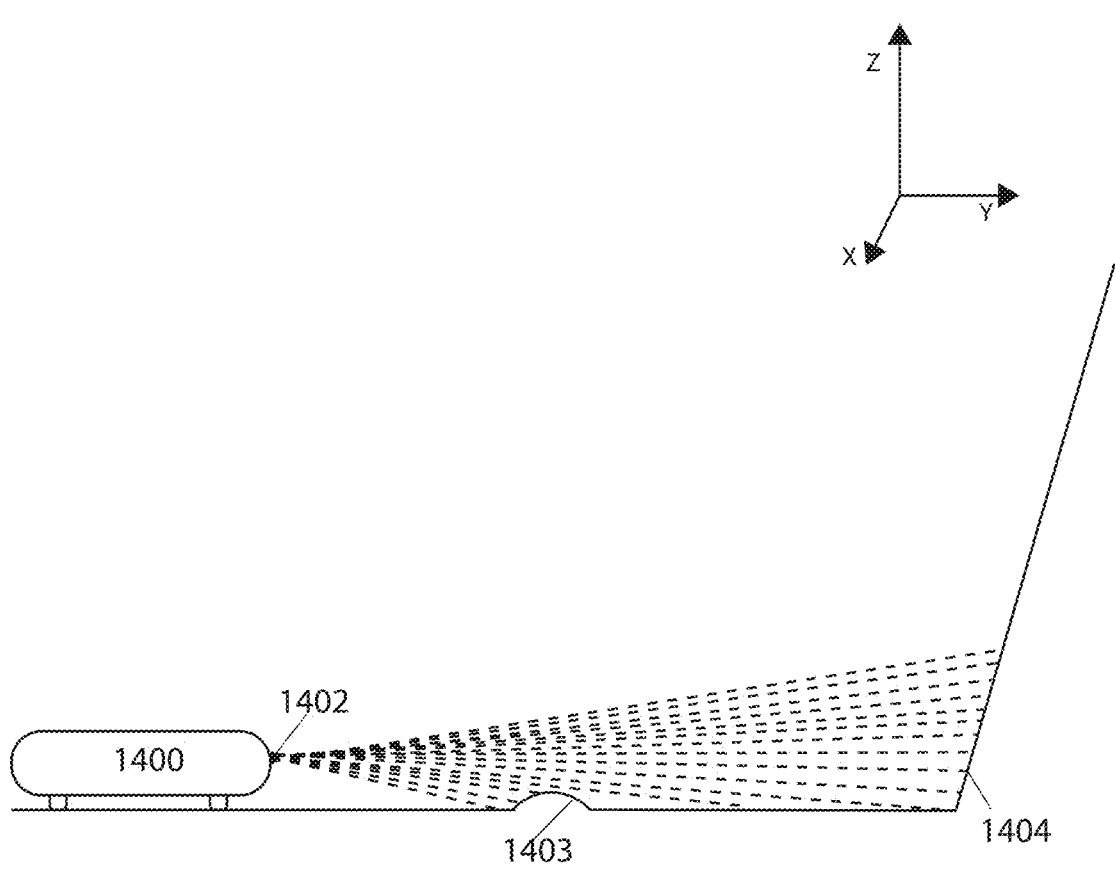
FIG. 14 illustrates an example of classifying a feature of an environment observed using a sensor of a robotic device in some embodiments.

In embodiments, constructing the map of the environment from 3D point clouds can be advantageous as certain features that may be indistinguishable in a 2D point cloud may be identified in a 3D point cloud. For example, with 2D point clouds, depth readings to objects are only captured at a particular height, therefore, if there is an obstacle in the surface of an environment, such as a bump, the processor of the robotic device may be unaware. However, with a 3D point cloud, the obstacle may be observed as sensors of the robotic device may take readings in all three directions. For example, FIG. 13A illustrates top and side view of robotic vacuum 1300 and readings 1301 taken in the x- and y-direction by sensor 1302. Since readings 1301 are only taken in the x- and y-direction, slight slope 1303 may be identified as an obstacle, such as a wall, resulting in robotic vacuum 1300 avoiding area 1304 while it is actually accessible by robotic vacuum 1300 for cleaning. FIG. 13B illustrates top and side views of robotic vacuum 1300 and readings 1305 taken in the x-, y-, and z-direction by sensor 1302. Since readings 1305 are taken in the x-, y-, and z-direction, slight slope 1303 may be identified as a climbable obstacle resulting in robotic vacuum 1300 cleaning area 1304. In embodiments, the control system of the robotic device may be trained using deep learning to distinguish between features such as, climbable bump, unclimbable bump, wall, and furniture within the working environment. For example, FIG. 14 illustrates robotic device 1400 and readings 1401 taken in the x-, y-, and z-direction by sensor 1402. The control system of robotic device 1400 may distinguish protrusion 1403 and slope 1404 within the 3D point cloud and based on their features may classify them as climbable or unclimbable obstacles. For example, protrusion 1403 may be classified as climbable while slope 1404 may be classified as unclimbable. In embodiments, a protrusion and/or slope may be distinguished as climbable or unclimbable based on the reward historically generated for past protrusions and/or slopes with similar features to those being considered, wherein the magnitude of the reward may be based on the level of completion of the climbing path.

In some embodiments, the constructed plot of the boundary may be three dimensional maps, e.g., indicating the position of walls, doorways, hallways, niches, and the like in the area being plotted. In some embodiments, the plot of the boundary may be two dimensional maps, e.g., point clouds or polygons indicating obstructions at a given height (or range of heights, for instance from zero to 5 or 10 centimeters or less) above the floor while discarding data pertaining to higher features.

In some embodiments, more than one camera may be used to improve accuracy of the plotted boundary. For example, a plurality of distance measuring cameras (e.g., carried by the robot) may be used simultaneously (or concurrently) where distance measurements from each camera are used to more accurately plot the boundary of the enclosure. The use of a plurality of distance measuring cameras is expected to allow for the collection of distance measurements from different perspectives and angles, for example. Where more than one distance measuring camera is used, triangulation or others suitable methods may be used for further data refinement and accuracy. In some embodiments, a 360-degree LIDAR is used to create a plotted boundary of the enclosure. It should be emphasized, though, that embodiments are not limited to techniques that construct a plotted boundary in this way, as the present techniques may also be used for plane finding in augmented reality, barrier detection in virtual reality applications, outdoor mapping with autonomous drones, and other similar applications, which is not to suggest that any other description is limiting.

The foregoing descriptions of specific embodiments of the invention have been presented for purposes of illustration and description. They are not intended to be exhaustive or to limit the invention to the precise forms disclosed.

In some embodiments, the map of the area, including but not limited to doorways, sub areas, perimeter openings, and information such as coverage pattern, room tags, order of rooms, etc. may be available to the user through a graphical user interface (GUI) such as a smartphone, computer, tablet, dedicated remote control, or any device that may display output data from the robotic device and receive inputs from a user. The map may be generated by data from sensors on the robotic device. Through the GUI, a user may review, accept, decline, or make changes to, for example, the environmental representation and settings and operations of the robotic device within the environment, which may include, but are not limited to, type of coverage algorithm of the entire area or each subarea, correcting or adjusting map boundaries and the location of doorways, creating or adjusting subareas (which in some instances are divided using doorways), order of cleaning subareas, scheduled cleaning of the entire area or each subarea, and activating or deactivating tools such as UV light, suction and mopping. User inputs are sent from the GUI to the robotic device for implementation. Data may be sent between the robotic device and the user interface through one or more network communication connections. Any type of wireless network signals may be used, including, but not limited to, radio signals, Wi-Fi signals, or Bluetooth signals. These techniques are further described in U.S. patent application Ser. Nos. 15/949,708, 15/272,752, and 62/661,802, 62/631,050, the entirety of which is incorporated herein by reference.

In some embodiments, a sensor suite carried by the robot may sense (e.g., either explicitly by things like time-of-flight sensors or LIDAR, or implicitly via techniques like inferring distance from parallax in stereoscopic cameras) distances to objects (like walls and furniture) in a workspace within a sensing area. The sensing area may be constrained in one direction (e.g., radially outward, horizontally) by a threshold distance beyond which the sensors do not provide reliable data. The sensing area may also be constrained in another dimension by a field of view (e.g., a horizontal angular field of view, like that of a camera). In some cases, the threshold distance is less than 20 meters, 10 meters, or 5 meters, for example, and the angular field of view is less than 180 degrees. In some cases, the sensing area is less than 50%, 10%, or 5%, for example, of the area of a working area, and in some cases, the sensing area is constrained by line of sight from the robot and, thus, depend on location and orientation of the robot relative to obstacles.

In some cases, the robot may be instructed to perform a task in a partially or fully un-mapped workspace, e.g., a new room, house, or area in which furniture has moved. As the robot moves through the workspace, the robot may gather information about the workspace within areas that fall within the sensing area (also called "sensed area" without regard to tense), as that area is moved over the room in virtue of movement of the robot. For instance, the robot may dynamically construct a map as it moves through the workspace that indicates areas that have fallen within the sensing area and the location of things sensed within those areas (e.g., the location of walls and furniture expressed in various formats, like vector graphic, point-cloud, or bitmap formats). For instance, embodiments may designate a unit tile in a regular tiling map (like a pixel map with a rectangular or hexagonal tiling) with a value of 0 if it has fallen within the sensing area but nothing was detected and 1 if it has fallen within the sensing area and something was detected at the location corresponding to the unit tile. As a result, the size of the map may increase as additional areas are sensed.

In some embodiments, as the robot moves through the work area, the robot may repeatedly (e.g., periodically or in response to various events) interrogate the dynamically formed map, as it is currently constituted, to detect unexplored boundaries. Some embodiments may select an initial point on the map on a perimeter of the map (which may be a boundary of the workspace or a boundary of the explored areas, depending on the value stored in association therewith), such as a tile with a smallest or largest set of coordinate values in each spatial dimension. Some embodiments may then traverse the perimeter of the map and select those areas (e.g., linear or non-linear lines of adjacent unit tiles) determined to be both 1) on the perimeter of the explored area indicated by the map and 2) within the explored area but do not indicate a boundary. Some embodiments may group the resulting locations into perimeter segments by grouping those selected locations that are adjacent to one another. The resulting set of segments may be designated in memory as segments partially bounding unexplored areas. Similar techniques may be applied to a convex hull of a point cloud.

In some cases, the dynamically formed map may have more than one perimeter, e.g., maps with internal holes. In some embodiments, the robotic device may detect additional perimeters with a variety of techniques and repeat the above operations to supplement the set of segments at least partially bounding unexplored areas. For instance, in some embodiments, the processor of the robotic device may recursively search a pixel map, iteratively determining whether points are either not on a perimeter or are among the points on the above-processed perimeter. In response to detecting a point that does not satisfy these criteria, the processor of the robotic device may designate that point as corresponding to an additional perimeter and repeat the above operations beginning with the point at the newly detected perimeter. In some embodiments, the processor may recursively call the process for each point adjacent that currently being processed. Or in some embodiments, the processor may perform a brute-force search of every point in such a map to classify points as either being on an un-explored perimeter or being explored (by virtue of falling within the sensing area of the robot at one point in time)/being a boundary sensed by the robot.

Some embodiments may filter out candidate segments that otherwise meet the above-specified criteria. Some embodiments may filter out those perimeter segments of less than a threshold length to reduce the effect of noise in sensor readings. Some embodiments may merge segments separated by less than a threshold distance into a single segment for similar reasons. In some cases, a segment may be a single tile or point in a point cloud. Some segments may correspond to virtual boundaries designated by a user or a light-beam as boundaries not to be crossed by the robot, in which case such segments (or portions thereof corresponding to these boundaries) may be filtered out. Some embodiments may filter out segments determined to be external to a bounded area defined by boundaries of the workspace (like walls) documented in the map and virtual boundaries documented in the map, e.g., a segment on the far side of an entry to hallway with a virtual barrier defined by user input designating a line across the entry to the hallway. Some embodiments may detect closed bounded areas for such purposes by recursively searching an area by calling the routine a current tile, designating that tile as having been visited, and calling the routine with adjacent unvisited tiles of a currently visited tiles until all tiles have been designate as having been visited in memory. Segments outside of the resulting area, separated from the area by a virtual or detected boundary (and not just an un-sensed area) may be filtered out (e.g., excluded from the selection of areas to explore for all or some purposes).

In some cases, areas may be designated as having been sensed by the robot with a confidence score, e.g., ranging from 0 to 1, and multiple sensor readings corresponding to the same area may be combined to determine the confidence score. For instance, locations further from the robot in the sensing area may have associated therewith a lower confidence score, and multiple passes from different angles may be combined (e.g., with a Bayesian classifier) to produce a higher confidence score. In some cases, the segments above may be selected based on whether points on the perimeter of the map are below a threshold confidence score. In some cases, interior regions of the map may have low-confidence holes, and embodiments may classify segments along the perimeter these low-confidence holes as warranting exploration with the techniques described above to analyze interior perimeters.

Segments of perimeters may be selected explicitly (e.g., in the manner described above) or implicitly, e.g., by selecting areas of the map that corresponds to the segment. For instance, embodiments may implicitly select segments by determining an exploration value of points and robot (or sensor) orientations at those points based on amounts of such segments that are placed within the sensed area of the robot in virtue of the robot having that position and orientation. Some embodiments may then determine a route for the robot based on those exploration values, e.g., with a hill climbing routine (e.g., by calculating a partial derivative of such a value with respect to each of two or more spatial dimensions and rotation directions and causing the robot to move or rotate in directions that the partial derivatives indicate will increase the exploration value locally until a maximum is reached, or by selecting those positions and orientations having greater than a threshold value and routing the robot to those positions and orientations.

Some embodiments may cause the robot to move to a location in which the selected segments are overlapped by the sensing area of the robot, thereby expanding the dynamically formed map into unexplored areas. For instance, embodiments may select a route that positions the robot on a line orthogonal to a mid-point between the endpoints of a segment, oriented on the line, with the sensing area center on the segment. In some embodiments, there robot may then be caused to move through the segment, e.g., until a boundary is detected, updating the above-described map, and potentially repeating the above described process as the robot moves. Embodiments may form a new version of the above-described map (e.g., by appending new information or updating an extant copy) based on the resulting sensor readings in newly explored areas. Areas with greater than a threshold confidence score (or otherwise designated as being based on adequate sensing within the sensing area of the robot) are referred to as "mapped" by a version of the map reflecting that information. Thus, as the dynamic map evolves, increasing areas of a workspace are mapped by updated versions of the resulting map. The area documented in the mapped version is referred to as an "extent" of the map.

In some cases, the segments may be input to the above-described Markov decision process (MDP), which may be configured to determine a route based on a tradeoff between exploitation (e.g., cleaning in the areas that are within the map) and exploration (e.g., causing the scanning area to traverse the above-described segments). In some embodiments, a tradeoff between exploration and exploitation may be expressed in a value function of the MDP. Or various other approaches may be implemented to select a route that makes the appropriate tradeoff between exploration and exploitation, examples including route selection through simulated annealing, genetic algorithms, evolutionary algorithms, and the like.

In some embodiments, the mapping methods described herein are combined with other mapping methods. Examples of other mapping methods are described in U.S. patent applications Ser. Nos. 16/048,185, 62/637,156, 16/048,179, 62/613,005, 62/599,216, 62/573,579, 62/637,156, 62/573, 598, 62/591,217, and U.S. Patent App. titled Methods for Finding the Perimeter of a Place Using Observed Coordinates, by the same applicant, filed on the same day as this patent filing, and U.S. Patent App. titled Method for Constructing a Map While Performing Work, by the same applicant, filed on the same day as this patent the entire contents of which are hereby incorporated by reference.

In some embodiments, the processor of the robotic device uses sensor data to estimate its location within the environment prior to beginning and simultaneously during the mapping process. In some embodiments, sensors of the robotic device capture data and the processor initially estimates the location of the robotic device based on the data and measured movement (e.g., using devices such as a gyroscope, optical encoder, etc.) of the robotic device. As more data is collected, the processor increases the confidence in the estimated location of the robotic device, and when movement occurs the processor decreases the confidence due to noise in measured movement. Some examples of methods for localizing a robotic device while creating a map of the environment are described in U.S. Patent Application Nos. 62/746,688, 62/740,573, and 62/740,580, the entire contents of which are hereby incorporated by reference.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted; for example, such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

The invention claimed is:

1. A robot, comprising:
a chassis;
a set of wheels;
a plurality of sensors;
a processor;
a tangible, non-transitory, machine-readable medium storing instructions that, when executed by the processor, effectuate operations comprising:
    generating, with the processor, a map of a workspace of the robot in a work session, wherein:
        the robot carries at least one sensor that senses data indicative of locations of physical objects and walls within a sensed area by the at least one sensor, wherein the sensed data comprises measured distances to at least boundaries of the workspace and the map of the workspace is generated based on successively merged measured distances, plotting the boundary of the workspace, identifying gaps in the plotted boundary, and navigating to identified gaps until no gaps exists in the plotted boundary and the plotted boundary is a complete closed loop, and
        the map of the workspace is generated in full when the data sensed by the at least one sensor comprises sensed area overlaps in at least a part of the workspace, wherein the area overlaps comprise areas sensed from different positions and orientations of the robot within the workspace;
    saving, with the processor, the map of the workspace to a memory of the robot or the cloud for being used in a subsequent run; and
    wherein the robot is configured to be paired with an external computing device in order to:
        receive at least one input designating a modification to the map of the workspace; a unique tag for a subarea within the map of the workspace; a schedule for cleaning by the robot an area to avoid; and an instruction to start or stop vacuuming or mopping.

2. The robot of claim 1, wherein the operations further comprise:
tracking in a subsequent work session, with the processor, areas covered by the robot during the subsequent work session.

3. The robot of claim 1, wherein the operations further comprise:

segmenting, with the processor, the map of the workspace into different subareas based on identified gaps in the plotted boundary.

4. The robot of claim 3, wherein the map of the workspace depicts segmented subareas with dividers.

5. The robot of claim 1, wherein the operations further comprise:

providing, to the processor, a unique tag to at least some subareas within the map of the workspace.

6. The robot of claim 1, wherein the robot is further configured to receive at least one input designating a merger of two subareas into one larger area and a division of a single area into two smaller subareas.

7. The robot of claim 2, wherein the robot is further configured to devise a coverage pattern of the robot.

8. The robot of claim 1, wherein the robot is further configured to devise an optimal order of subareas for coverage by the robot.

9. The robot of claim 1, wherein the robot is further configured to receive at least one input designating an adjustment to a map boundary.

10. The robot of claim 7, wherein at least one decision relating to coverage of a subarea by the robot is based on a flooring type of a floor surface of the robot.

11. The robot of claim 1, wherein the robot further comprises:

a camera;

at least one light source for emitting light onto objects within the workspace;

wherein:

the light emitted onto the objects within the workspace falls within a field of view of the camera; and the camera is positioned at angle in relation to a horizontal plane.

12. The robot of claim 1, wherein the robot further comprises a vacuuming apparatus and a mopping apparatus.

13. The robot of claim 1, wherein the map of the workspace is three-dimensional.

14. The robot of claim 1, wherein the operations further comprise:

determining, with the processor, identifying an object captured in an image with pixels separated from background pixels.

15. The robot of claim 1, wherein the robot uses the map of the workspace to devise a coverage path for performing work in subsequent work sessions.

16. The robot of claim 1, wherein generating the map of the workspace comprises iterations of:

generating, with the processor, a first iteration of the map;

selecting, with the processor, a first undiscovered area of the workspace;

in response to selecting the first undiscovered area, causing, with the processor, the robot to move to a second closer position and orientation relative to the first undiscovered area to sense data in at least part of the first undiscovered area;

determining, with the processor, that the sensed area overlaps with at least part of the workspace in the first undiscovered area; and generating, with the processor, a second iteration of the map, the second iteration of the map being a larger area of the workspace than the first iteration of the map and based at least in part on data sensed from the second position and orientation and movement measured from the first position and orientation to the second position and orientation.

17. The robot of claim 16, wherein generating the map of the workspace further comprises:

updating, with the processor, a first iteration of the map to indicate that different portions have different mapping confidence scores, wherein portions comprising overlap between the sensed area and at least part of the workspace in the first undiscovered area have higher confidence scores.

18. The robot of claim 1, wherein the processor of the robot may be trained using deep learning to distinguish between a climbable bump and an unclimbable bump within the workspace.

19. A method for generating a map, comprising:

generating, with a processor of a robot, a map of a workspace of the robot in a work session, wherein:

the robot carries at least one sensor that senses data indicative of locations of physical objects and walls within a sensed area by the at least one sensor, wherein the sensed data comprises measured distances to at least boundaries of the workspace and the map of the workspace is generated based on successively merged measured distances, plotting boundary of the workspace, identifying gaps in the plotted boundary, and navigating to identified gaps until no gaps exists in the plotted boundary and the plotted boundary is a complete closed loop, and the map of the workspace is generated in full when the data sensed by the at least one sensor comprises sensed area overlaps in at least a part of the workspace, wherein the area overlaps comprise areas sensed from different positions and orientations of the robot within the workspace;

saving, with the processor, the map of the workspace to a memory of the robot or the cloud for being used in a subsequent run; and wherein the robot is configured to be paired with an external computing device in order to:

receive at least one input designating a modification to the map of the workspace; a unique tag for a subarea within the map of the workspace; a schedule for cleaning by the robot an area to avoid; and an instruction to start or stop vacuuming or mopping.

20. A tangible, non-transitory, machine-readable medium storing instructions that when executed by a processor of a robot effectuate operations comprising:

generating, with the processor of the robot, a map of a workspace of the robot in a work session, wherein:

the robot carries at least one sensor that senses data indicative of locations of physical objects and walls within a sensed area by the at least one sensor, wherein the sensed data comprises measured distances to at least boundaries of the workspace and the map of the workspace is generated based on successively merged measured distances, plotting boundary of the workspace, identifying gaps in the plotted boundary, and navigating to identified gaps until no gaps exists in the plotted boundary and the plotted boundary is a complete closed loop, and the map of the workspace is generated in full when the data sensed by the at least one sensor comprises sensed area overlaps in at least a part of the workspace, wherein the area overlaps comprise areas sensed from different positions and orientations of the robot within the workspace;

saving, with the processor, the map of the workspace to a memory of the robot or the cloud for being used in a subsequent run; and wherein the robot is configured to be paired with an external computing device in order to:

receive at least one input designating a modification to the map of the workspace; a unique tag for a subarea within the map of the workspace; a schedule for cleaning by the robot an area to avoid; and an instruction to start or stop vacuuming or mopping.

\*    \*    \*    \*    \*